United States Patent
Jang et al.

(10) Patent No.: US 11,051,671 B2
(45) Date of Patent: Jul. 6, 2021

(54) CLEANER

(71) Applicant: LG ELECTRONICS INC., Seoul (KR)

(72) Inventors: Jaewon Jang, Seoul (KR); Jeongseop Park, Seoul (KR); Youngkouk Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 16/333,138

(22) PCT Filed: Jul. 14, 2017

(86) PCT No.: PCT/KR2017/007555
§ 371 (c)(1),
(2) Date: Mar. 13, 2019

(87) PCT Pub. No.: WO2018/012917
PCT Pub. Date: Jan. 18, 2018

(65) Prior Publication Data
US 2019/0307305 A1    Oct. 10, 2019

Related U.S. Application Data

(60) Provisional application No. 62/362,358, filed on Jul. 14, 2016.

(51) Int. Cl.
*A47L 11/14* (2006.01)
*A47L 11/16* (2006.01)
(Continued)

(52) U.S. Cl.
CPC ............. *A47L 11/283* (2013.01); *A47L 9/009* (2013.01); *A47L 9/0606* (2013.01);
(Continued)

(58) Field of Classification Search
CPC ........ A47L 11/14; A47L 11/16; A47L 11/161; A47L 11/1625; A47L 11/283;
(Continued)

(56) References Cited

U.S. PATENT DOCUMENTS

| | | |
|---|---|---|
| 3,381,334 A | 5/1968 | Redmond |
| 3,827,099 A | 8/1974 | Allaire et al. |

(Continued)

FOREIGN PATENT DOCUMENTS

| | | |
|---|---|---|
| CN | 1823677 | 8/2006 |
| CN | 2817718 U | 9/2006 |

(Continued)

OTHER PUBLICATIONS

Taiwan Office Action dated May 22, 2020, on Taiwan Patent Application No. 107101298.

(Continued)

*Primary Examiner* — Randall E Chin
(74) *Attorney, Agent, or Firm* — Finnegan, Henderson, Farabow, Garrett & Dunner, LLP

(57) ABSTRACT

A cleaner includes a body forming an external appearance, a rotating plate provided at a lower side of the body, a mop unit coupled to a lower side of the rotating plate so as to be in contact with a floor, a spin shaft connected to an upper side of the rotating plate so as to rotate the rotating plate, a water supply reservoir configured to surround a periphery of the spin shaft and spaced apart from the spin shaft so as to define a water supply space, and a water supply module configured to supply water to the water supply space. The rotating plate forms a water supply hole configured to interconnect the water supply space and the lower side of the rotating plate.

15 Claims, 24 Drawing Sheets

(51) Int. Cl.

| | |
|---|---|
| *A47L 11/162* | (2006.01) |
| *A47L 11/283* | (2006.01) |
| *A47L 11/293* | (2006.01) |
| *A47L 11/40* | (2006.01) |
| *A47L 11/282* | (2006.01) |
| *B08B 3/04* | (2006.01) |
| *B08B 3/08* | (2006.01) |
| *A47L 11/292* | (2006.01) |
| *A47L 11/34* | (2006.01) |
| *B25J 9/16* | (2006.01) |
| *B25J 11/00* | (2006.01) |
| *G05D 1/02* | (2020.01) |
| *A47L 9/00* | (2006.01) |
| *A47L 9/06* | (2006.01) |
| *A47L 11/20* | (2006.01) |
| *B25J 5/00* | (2006.01) |
| *B25J 9/00* | (2006.01) |
| *B25J 9/12* | (2006.01) |
| *A47L 13/20* | (2006.01) |
| *B08B 1/04* | (2006.01) |
| *A47L 9/28* | (2006.01) |
| *A47L 11/24* | (2006.01) |

(52) U.S. Cl.
CPC ........... *A47L 9/2826* (2013.01); *A47L 9/2852* (2013.01); *A47L 11/14* (2013.01); *A47L 11/16* (2013.01); *A47L 11/161* (2013.01); *A47L 11/20* (2013.01); *A47L 11/201* (2013.01); *A47L 11/24* (2013.01); *A47L 11/282* (2013.01); *A47L 11/292* (2013.01); *A47L 11/293* (2013.01); *A47L 11/34* (2013.01); *A47L 11/40* (2013.01); *A47L 11/4002* (2013.01); *A47L 11/4005* (2013.01); *A47L 11/405* (2013.01); *A47L 11/408* (2013.01); *A47L 11/4011* (2013.01); *A47L 11/4013* (2013.01); *A47L 11/4038* (2013.01); *A47L 11/4058* (2013.01); *A47L 11/4061* (2013.01); *A47L 11/4066* (2013.01); *A47L 11/4069* (2013.01); *A47L 11/4072* (2013.01); *A47L 11/4083* (2013.01); *A47L 11/4088* (2013.01); *A47L 13/20* (2013.01); *B08B 1/04* (2013.01); *B08B 3/041* (2013.01); *B08B 3/08* (2013.01); *B25J 5/007* (2013.01); *B25J 9/0003* (2013.01); *B25J 9/126* (2013.01); *B25J 9/1664* (2013.01); *B25J 9/1666* (2013.01); *B25J 11/0085* (2013.01); *G05D 1/0223* (2013.01); *A47L 2201/00* (2013.01); *A47L 2201/04* (2013.01); *A47L 2201/06* (2013.01); *G05D 2201/0203* (2013.01)

(58) Field of Classification Search
CPC .... A47L 11/293; A47L 11/40; A47L 11/4038; A47L 11/4066; A47L 11/4069; A47L 11/408; A47L 11/4083; A47L 11/4088
See application file for complete search history.

(56) References Cited

U.S. PATENT DOCUMENTS

| | | | |
|---|---|---|---|
| 4,418,342 A | 11/1983 | Aschoff et al. | |
| 5,991,951 A | 11/1999 | Kubo et al. | |
| 6,493,896 B1 | 12/2002 | Stuchlik et al. | |
| 7,320,149 B1 | 1/2008 | Huffman et al. | |
| 9,814,364 B1 | 11/2017 | Caruso | |
| 2004/0163199 A1* | 8/2004 | Hsu | A47L 11/4008 15/320 |
| 2004/0221474 A1 | 11/2004 | Slutsky et al. | |
| 2005/0015913 A1 | 1/2005 | Kim et al. | |
| 2005/0166356 A1 | 8/2005 | Uehigashi | |
| 2005/0183230 A1 | 8/2005 | Uehigashi | |
| 2006/0185690 A1 | 8/2006 | Song | |
| 2007/0261715 A1 | 11/2007 | Lee et al. | |
| 2010/0031463 A1 | 2/2010 | Adams et al. | |
| 2012/0084938 A1 | 4/2012 | Fu | |
| 2012/0125363 A1 | 5/2012 | Kim et al. | |
| 2013/0096717 A1 | 4/2013 | Yoon et al. | |
| 2013/0263889 A1 | 10/2013 | Yoon et al. | |
| 2014/0130289 A1 | 5/2014 | Hyun et al. | |
| 2014/0209122 A1 | 7/2014 | Jung et al. | |
| 2015/0142169 A1 | 5/2015 | Kim et al. | |
| 2015/0143646 A1 | 5/2015 | Jeong et al. | |
| 2015/0150429 A1 | 6/2015 | Yoo et al. | |
| 2015/0182090 A1 | 7/2015 | Park et al. | |
| 2015/0196183 A1 | 7/2015 | Clark et al. | |
| 2016/0022109 A1 | 1/2016 | Dooley et al. | |
| 2016/0051108 A1 | 2/2016 | Huang et al. | |
| 2018/0120833 A1 | 5/2018 | Lindhe et al. | |
| 2019/0270124 A1 | 9/2019 | Jang et al. | |

FOREIGN PATENT DOCUMENTS

| | | |
|---|---|---|
| CN | 101267759 A | 9/2008 |
| CN | 101305893 A | 11/2008 |
| CN | 101313829 | 4/2012 |
| CN | 202341952 U | 7/2012 |
| CN | 102652654 | 9/2012 |
| CN | 103006153 | 4/2013 |
| CN | 203113255 U | 8/2013 |
| CN | 203296009 U | 11/2013 |
| CN | 103717117 A | 4/2014 |
| CN | 104244794 A | 12/2014 |
| CN | 104337469 | 2/2015 |
| CN | 104918529 A | 5/2015 |
| CN | 104757906 | 7/2015 |
| CN | 105744874 | 7/2016 |
| CN | 205411088 U | 8/2016 |
| EP | 2702918 A1 | 3/2014 |
| EP | 2762051 A2 | 8/2014 |
| EP | 3485785 | 5/2019 |
| JP | H05-300860 | 11/1993 |
| JP | H11-178764 | 7/1999 |
| JP | 2000-051128 | 2/2000 |
| JP | 2000070203 A | 3/2000 |
| JP | 2005-006816 | 1/2005 |
| JP | 2009-056216 | 3/2009 |
| JP | 2014-045898 | 3/2014 |
| KR | 20-0195057 | 9/2000 |
| KR | 10-2002-0074985 | 10/2002 |
| KR | 10-2005-0012047 | 1/2005 |
| KR | 10-2005-0014652 | 2/2005 |
| KR | 20-0412179 U | 3/2006 |
| KR | 20-0413777 | 4/2006 |
| KR | 10-2006-0094374 | 8/2006 |
| KR | 10-0669889 | 1/2007 |
| KR | 20-0435111 U | 1/2007 |
| KR | 10-0822785 | 4/2008 |
| KR | 10-2009-0026031 | 3/2009 |
| KR | 10-2009008665 | 8/2009 |
| KR | 10-2009-0119638 | 11/2009 |
| KR | 10-2010-006151 | 1/2010 |
| KR | 20-2010-0001717 U | 2/2010 |
| KR | 10-0962121 | 6/2010 |
| KR | 10-0985376 | 10/2010 |
| KR | 10-2010-0133870 | 12/2010 |
| KR | 10-1000178 | 12/2010 |
| KR | 10-2011-0105305 | 9/2011 |
| KR | 10-1073102 | 11/2011 |
| KR | 20-0458863 | 3/2012 |
| KR | 20-2012-0002399 U | 4/2012 |
| KR | 10-2012-0042391 | 5/2012 |
| KR | 10-2012-0055891 | 6/2012 |
| KR | 10-2012-0100682 | 9/2012 |
| KR | 10-2013004242 | 4/2013 |
| KR | 10-1303159 | 9/2013 |
| KR | 10-2013-0129059 | 11/2013 |
| KR | 10-2014002247 | 2/2014 |

(56) References Cited

FOREIGN PATENT DOCUMENTS

| | | |
|---|---|---|
| KR | 10-2015-0014351 | 2/2015 |
| KR | 10-2015-0022133 | 3/2015 |
| KR | 10-2015-0031821 | 3/2015 |
| KR | 10-2015-0048490 | 5/2015 |
| KR | 10-2015-0057959 | 5/2015 |
| KR | 10-1522177 | 5/2015 |
| KR | 10-2015-0060030 | 6/2015 |
| KR | 10-2015007809 | 7/2015 |
| KR | 10-2015-0107396 | 9/2015 |
| KR | 10-2015-0107693 | 9/2015 |
| KR | 10-2015010769 | 9/2015 |
| KR | 10-2015-0116311 | 10/2015 |
| KR | 10-1569058 | 11/2015 |
| KR | 10-2015-0139111 | 12/2015 |
| KR | 10-1578887 | 12/2015 |
| KR | 10-1595727 | 2/2016 |
| KR | 10-2016003361 | 3/2016 |
| KR | 10-2016-0090570 | 8/2016 |
| KR | 10-2016-0104429 | 9/2016 |
| KR | 10-2016-0122520 | 10/2016 |
| KR | 10-1678443 | 12/2016 |
| KR | 10-2018-0105109 | 9/2018 |
| TW | 537326 U | 6/2003 |
| TW | M455464 | 6/2013 |
| WO | WO 2015/186944 A1 | 12/2015 |
| WO | WO 2016/027957 | 2/2016 |
| WO | WO 2016/036183 A1 | 3/2016 |

OTHER PUBLICATIONS

European Search Report dated May 26, 2020, on European Patent Application No. 17827993.1.
European Search Report dated May 26, 2020, on European Patent Application No. 17827985.7.
Korean Notice of Allowance dated Jul. 1, 2020, on Korean Patent Application No. 10-2018-7036041.
U.S. Office Action dated Jul. 15, 2020, on U.S. Appl. No. 16/333,129.
Chinese Office Action dated Jul. 22, 2020, on Chinese Patent Applicatuin Ni, 201780056575.7.
Chinese Office Action dated Aug. 3, 2020, on Chinese Patent Application No. 201780056675.X.
European Search Report dated Aug. 13, 2020, on European Patent Application No. 17827983.2.
Korean Office Action dated Aug. 19, 2020, on Korean Patent Application No. 10-2020-7014910.
Korean Notice of Allowance dated Jun. 29, 2018, on Korean Patent Application No. 10-2017-0009364.
Korean Notice of Allowance dated Jun. 17, 2019, on Korean Patent Application No. 10-2018-0110855.
Taiwan Office Action dated Dec. 24, 2018, on Taiwan Patent Application No. 107101298.
PCT Search Report dated Sep. 28, 2017, on PCT International Patent appl. No. PCT/KR2017/007549.
PCT Search Report dated Nov. 20, 2017, on PCT International Patent appl. No. PCT/KR2017/007555.
PCT Search Report dated Nov. 20, 2017, on PCT International Patent appl. No. PCT/KR2017/007552.
PCT Search Report dated Nov. 20, 2017, on PCT International Patent appl. No. PCT/KR2017/007550.
PCT Search Report dated Nov. 23, 2017, on PCT International Patent appl. No. PCT/KR2017/007561.
PCT Search Report dated Nov. 23, 2017, on PCT International Patent appl. No. PCT/KR2017/007557.
PCT Search Report dated Nov. 23, 2017, on PCT International Patent appl. No. PCT/KR2017/007560.
PCT Search Report dated Nov. 23, 2017, on PCT International Patent appl. No. PCT/KR2017/007562.
Taiwan Office Action dated Dec. 18, 2018, on Taiwan Patent appl. No. 107101303.
Taiwan Office Action dated Dec. 25, 2018, on Taiwan Patent appl. No. 107101297.
Taiwan Office Action dated Sep. 18, 2019, on Taiwan Patent appl. No. 107101298.
Korean Notice of Allowance dated Jun. 17, 2019, on Korean Patent appl. No. 10-2018-0110855.
Korean Notice of Allowance dated Jun. 29, 2018, on Korean Patent appl. No. 10-2017-0009364.
Australian Office Action dated Jul. 16, 2019, on Australian Patent appl. No. 2017297104.
PCT Search Report dated Nov. 20, 2017, on PCT International Patent Application No. PCT/KR2017/007551.
European Search Report dated Mar. 31, 2020, on European Patent Application No. 17827982.4.
European Search Report dated May 4, 2020, on European Patent Application No. 17827984.0.
European Search Report dated Apr. 2, 2020, on European Patent Application No. 17827992.3.
U.S. Office Action dated May 22, 2020, on U.S. Appl. No. 16/333,098.
U.S. Office Action dated May 6, 2020, on U.S. Appl. No. 16/333,144.
Taiwan Office Action dated Oct. 30, 2018, on Taiwan Patent Application No. 107101299.
Korean Office Action dated Apr. 23, 2020, on Korean Patent Application No. 10-2018-7036043.
Korean Notice of Allowance dated Apr. 28, 2020, on Korean Patent Application No. 10-2018-7036042.
Korean Notice of Allowance dated Apr. 29, 2020, on Korean Patent Application No. 10-2018-7036039.
Chinese Office Action dated Sep. 21, 2020 on Chinese Patent Application No. 201780056578.0.
EP Search Report dated Aug. 14, 2020.
U.S. Office Action dated Sep. 21, 2020 on U.S. Appl. No. 16/333,138.
U.S. Office Action dated Oct. 6, 2020 on U.S. Appl. No. 16/333,124.
U.S. Office Action dated Oct. 9, 2020 on U.S. Appl. No. 16/333,135.

* cited by examiner 120a,120b

CLEANER

CROSS-REFERENCE TO RELATED APPLICATIONS

This application is a U.S. National Phase entry under 35 U.S.C. § 371 from PCT International Application No. PCT/KR2017/007555, filed Jul. 14, 2017, which claims the benefit of priority of U.S. Provisional Application No. 62/362,358, filed Jul. 14, 2016, the contents of which are incorporated herein by reference in its entirety.

TECHNICAL FIELD

The present invention relates to a cleaner that performs mopping.

BACKGROUND ART

A cleaner is a device that performs cleaning by suctioning dirt such as dust from the floor or mopping dirt on the floor. Recently, a cleaner capable of performing mopping has been developed. In addition, a robot cleaner is a device that performs cleaning autonomously via self-driving.

There has been known a robot cleaner capable of moving using a mop surface as the related art (Korean Registered Patent Publication No. 10-1602790). In the related art, the robot cleaner includes a first rotating member and a second rotating member, to which a pair of mop surfaces is fixed so as to be arranged in the transverse direction, the first and second rotating members being tilted outwards and downwards relative to the vertical axis. The robot cleaner according to the related art is moved as the first rotating member and the second rotating member rotate in the state in which only the mop surfaces fixed to the first rotating member and the second rotating member are in contact with the floor.

DISCLOSURE

Korean Registered Patent Publication No. 10-1602790 (Registered Date: Mar. 7, 2016)

Technical Problem

A first object of the present invention is to enable the efficient supply of water for wet mopping.

In the related art, when a portion of the area of the floor in which water is sprayed for wet mopping is not mopped, there is a problem in that a large amount of moisture remains on the floor, which is inconvenient. A second object of the present invention is to solve this problem.

In the related art, when mopping with a mop that is wet with water in advance, moisture becomes insufficient in a later stage of mopping compared to an early stage, causing inefficient mopping or the inconvenience of again wetting the mop. A third object of the present invention is to realize the continuously supply of a sufficient amount of water to a mop.

A fourth object of the present invention is to increase efficiency in terms of the movement of water and the distribution of water for wet mopping.

A fifth object of the present invention is to minimize the amount of water to be wasted or scattered in the process of supplying water to a mop, thereby allowing the water to be accurately supplied to a preset position.

A sixth object of the present invention is to realize the continuous supply of water to a mop without influencing various operating structures of a cleaner or the operation thereof.

A seventh object of the present invention is to increase the frictional force between a mop and the floor surface for effective mopping and driving of a robot cleaner.

An eighth object of the present invention is to realize the implementation of clean and efficient mopping by providing a device capable of performing both wet mopping and dry cleaning (dry mopping, vacuum cleaning and/or sweeping with a brush).

Technical Solution

To achieve the objects described above, according to an aspect of the present invention, there is provided a cleaner including a body defining an external appearance, a rotating plate provided at a lower side of the body, a mop unit coupled to a lower side of the rotating plate so as to be in contact with a floor, a spin shaft connected to an upper side of the rotating plate so as to rotate the rotating plate, a water supply reservoir configured to surround a periphery of the spin shaft and spaced apart from the spin shaft so as to define a water supply space, and a water supply module configured to supply water to the water supply space. The rotating plate forms a water supply hole configured to interconnect the water supply space and the lower side of the rotating plate.

The water supply space may be open at an upper side thereof, and may be configured so that water is introduced into the water supply space through the upper side of the water supply space.

The water supply reservoir may protrude upward of the rotating plate, and may extend in a peripheral direction of the spin shaft.

The water supply reservoir may take a form of a ring-shaped rib.

The water supply hole may be provided in a plural number so that a plurality of water supply holes is spaced apart from each other by a constant distance in a peripheral direction of the spin shaft.

The rotating plate may include a slope formed along a periphery of a lower end of the spin shaft, the slope forming a downward inclination in a centrifugal direction. The water supply hole may be located in the centrifugal direction of a lower end portion of the slope.

A side surface in a centrifugal direction XO of the water supply hole and a side surface in the counter-centrifugal direction XI of the water supply reservoir may be provided so as to extend vertically.

The cleaner may further include a water supply cabinet configured to form a space indented upward from a lower surface of the body so as to accommodate an upper end portion of the water supply reservoir therein, and a water feeder configured to guide water so as to pass through the water supply cabinet and to be introduced into the water supply reservoir.

The water supply cabinet may include a rotating-shaft support portion configured to rotatably support the spin shaft, and a partition configured to protrude from the rotating-shaft support portion so as to cover the upper end portion of the water supply reservoir.

The cleaner may further include a water supply cabinet disposed at the lower side of the body and configured to cover an upper side of the water supply reservoir when viewed from an upper side, and a water feeder configured to guide water so as to pass through the water supply cabinet and to be introduced into the water supply reservoir. The water supply module may include a water tank configured to store the water therein, and a supply pipe configured to connect the water tank and the water feeder to each other so as to guide movement of the water.

The cleaner may further include a rotating-shaft support portion, a lower end portion of which is inserted into the water supply space, configured to rotatably support the spin shaft, and a partition configured to protrude from the rotating-shaft support portion so as to cover an upper end portion of the water supply reservoir.

The cleaner may further include a tilting frame disposed on the body so as to be tiltable within a predetermined angular range. The spin shaft may be rotatably coupled to the tilting frame so as to be tiltable integrally with the tilting frame.

The cleaner may further include a water feeder fixedly disposed on the tilting frame and configured to guide water so as to be introduced into the water supply reservoir. The water supply module may include a water tank configured to store the water therein, and a supply pipe configured to connect the water tank and the water feeder to each other so as to guide movement of the water, the supply pipe flexibly bending depending on tilting of the tilting frame.

The water supply module may include a water tank configured to store water therein and a pump configured to apply pressure to the water in the water tank so as to supply the water to the water supply space. The cleaner may further include a controller configured to control the pump so as to adjust an amount of water to be supplied.

In accordance with another aspect of the present invention, there is provided a cleaner including a body defining an external appearance, a left spin-mop module and a right spin-mop module provided to perform mopping, and a water supply module configured to supply water to the left spin-mop module and the right spin-mop module. Each of the left spin-mop module and the right spin-mop module includes a rotating plate provided at a lower side of the body, a mop unit coupled to a lower side of the rotating plate so as to be in contact with a floor, a spin shaft connected to an upper side of the rotating plate so as to rotate the rotating plate, a water supply reservoir configured to surround a periphery of the spin shaft and spaced apart from the spin shaft so as to define a water supply space, and a water feeder configured to guide water so as to be introduced into the water supply reservoir. The rotating plate forms a water supply hole configured to interconnect the water supply space and the lower side of the rotating plate.

The water supply module may include a water tank configured to store the water therein, and a supply pipe configured to connect the water tank and the water feeder to each other so as to guide movement of the water. The supply pipe includes a common pipe configured to guide movement of the water at an upstream side, a first branch pipe configured to guide a portion of the water in the common pipe to the left spin-mop module, and a second branch pipe configured to guide a remaining portion of the water in the common pipe to the right spin-mop module.

Advantageous Effects

Through the solutions described above, it is possible to continuously supply a sufficient amount of water to a mop unit with high efficiency.

In addition, by directly supplying water to the mop unit, it is possible to reduce the degree to which moisture remains on the floor surface, compared to the case of directly spraying water to the floor surface.

In addition, by allowing water to be supplied to the mop unit in the vicinity of a spin shaft, it is possible to efficiently distribute water over the entire area of the mop unit by centrifugal force attributable to rotation of the mop unit.

In addition, through the provision of a water supply space, it is possible to allow the mop unit to gradually absorb water, and to store water in the water supply space for a while even if an excessive amount of water is temporarily supplied to a rotating plate.

In addition, by a plurality of water supply holes disposed in the peripheral direction of the spin shaft so as to be spaced apart from each other by a constant distance, it is possible to equally supply water in all directions of the mop unit about the spin shaft when the rotating plate rotates.

In addition, through the provision of a slope, it is possible to allow water to move down along the slope by centrifugal force attributable to gravity and the rotation of the rotating plate, thereby accurately guiding the water to the water supply holes.

In addition, with a configuration in which the side surface in the centrifugal direction XO of the water supply hole and the side surface in the counter-centrifugal direction XI of a water supply reservoir vertically extend, it is possible to allow water, which tends to move in the centrifugal direction XO by centrifugal force, to be wholly introduced into the water supply holes.

By providing a water supply cabinet that accommodates therein the upper end portion of the water supply reservoir, it is possible to minimize the scattering of water by the water supply cabinet, thereby guiding all of the water that is introduced into the water supply reservoir.

By inserting the lower end portion of a rotating-shaft support portion into the water supply space, it is possible to stably support the spin shaft and to guide water so as to be easily collected in the water supply space.

Through the provision of a tilting frame and the spin shaft capable of being integrally tilted with the tilting frame, it is possible to realize a suspension function for the rotating plate and to prevent abnormality in the supply of water to the mop unit.

Through the concrete configuration of a supply pipe, it is possible to equally supply water to two left and right spin-mop modules.

BEST MODE

Figure 1:
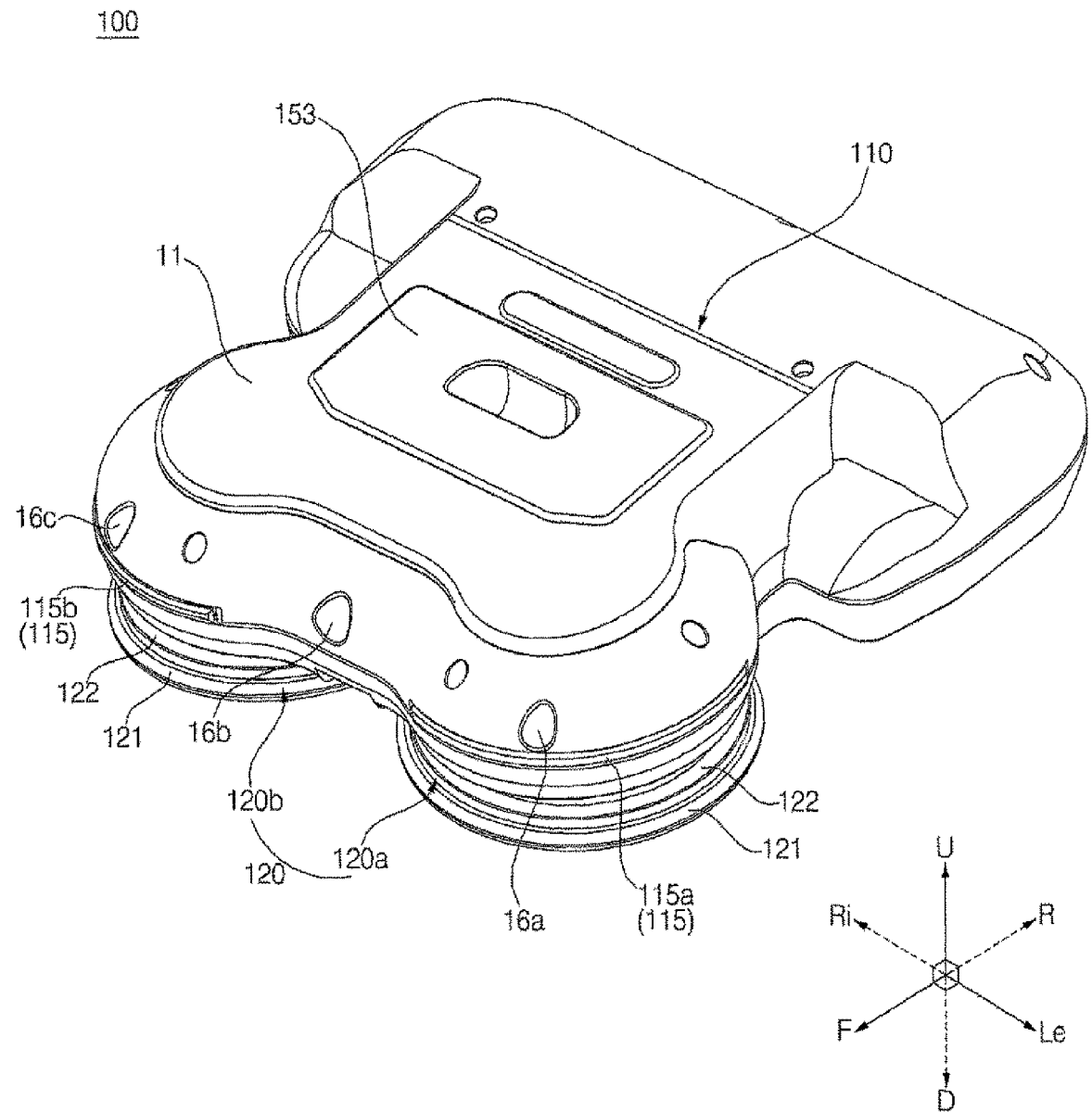
FIG. 1 is a perspective view of a cleaner 100 according to an embodiment of the present invention.
Figure 2:
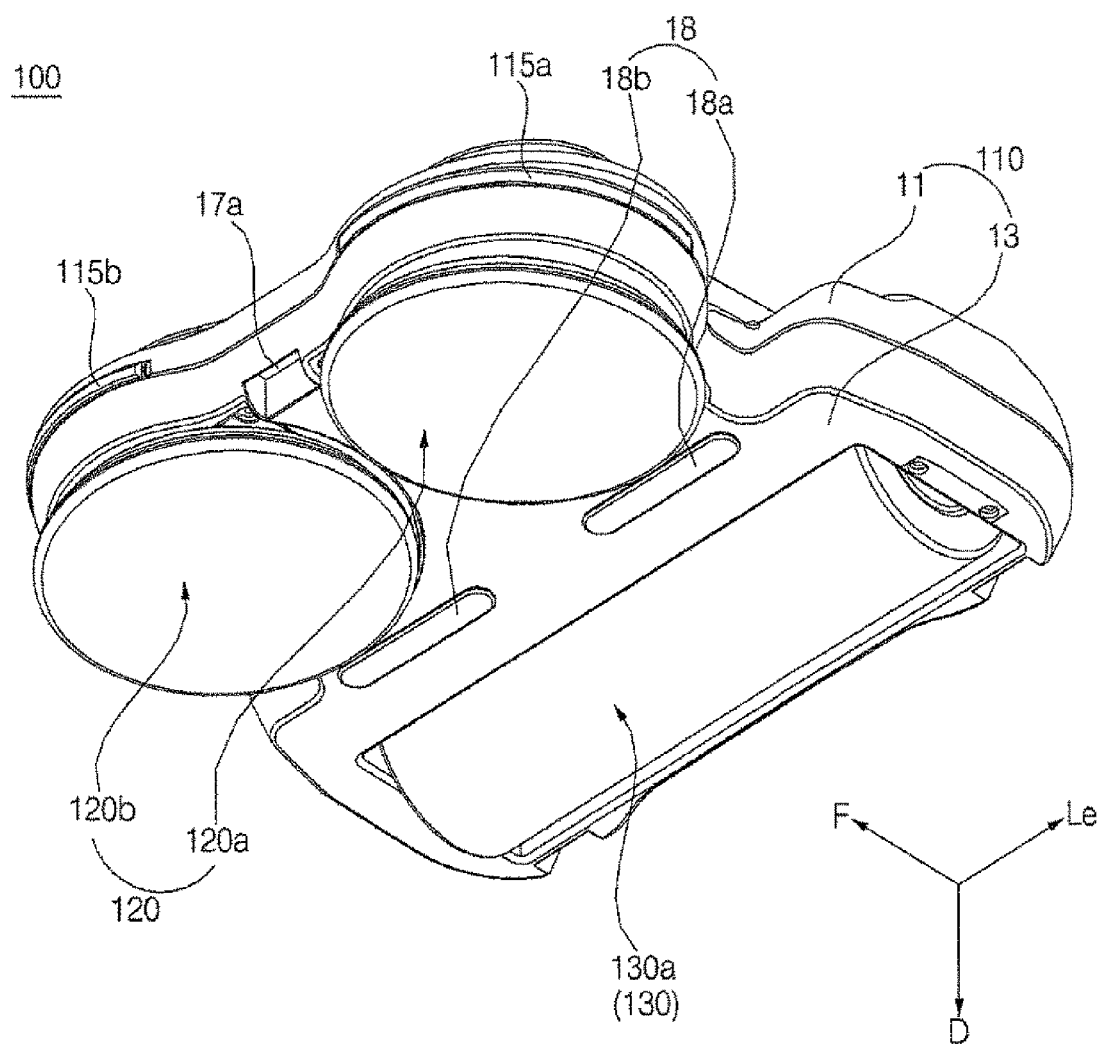
FIG. 2 is a perspective view of the cleaner 100 of FIG. 1 viewed at a different angle.

The expressions referring to directions such as "front (F)/rear (R)/left (Le)/right (R)/upper (U)/lower (D)" mentioned below are defined based on the illustrations in the drawings, but this is merely given to describe the present invention so as to be clearly understood, and it goes without saying that the respective directions may be defined differently depending on where the reference is placed.

Figure 22:
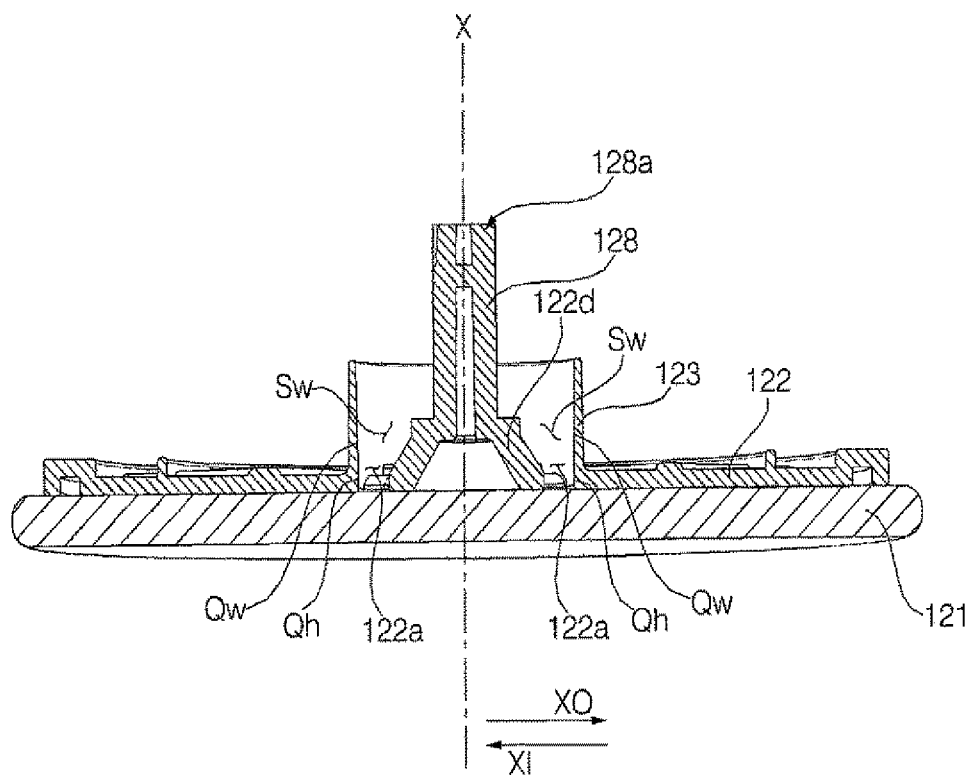
FIG. 22 is a vertical cross-sectional view of the spin mops 120a and 120b taken along line S7-S7' of FIG. 21.
Figure 23:
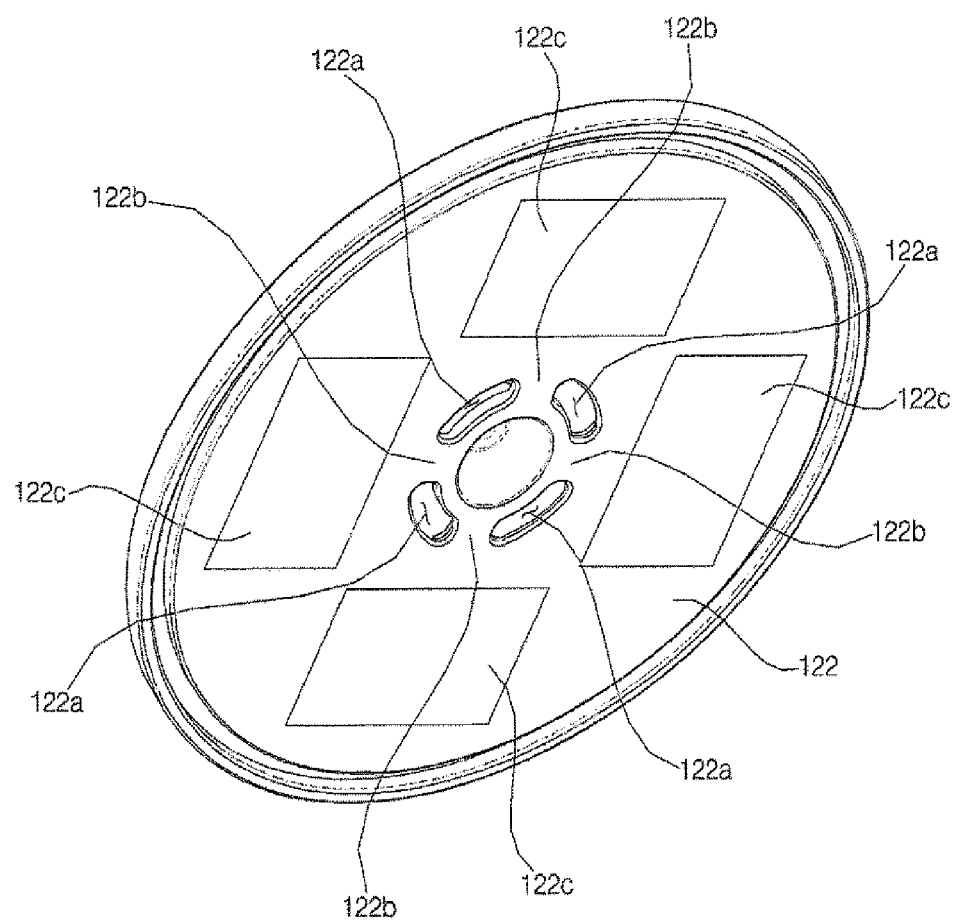
FIG. 23 is a perspective view illustrating the state in which a mop unit 121 is removed from the spin mops 120 and 120b of FIG. 20.

With regard to any one spin mop with reference to FIG. 22, the center axis X is the rotational axis about which the spin mop rotates, the centrifugal direction XO is the direction moving away from the center axis X, and the counter-centrifugal direction XI is the direction approaching the center axis X.

The use of terms, in front of which adjectives such as "first", "second", and "third" are used to describe constituent elements mentioned below, is intended only to avoid confusion of the constituent elements, and is unrelated to the order, importance, or relationship between the constituent elements. For example, an embodiment including only a second component without a first component is also feasible.

The 'mop' mentioned below may be applied variously in terms of material such as cloth or paper material, and may be used repeatedly by washing, or may be disposable.

The present invention may be applied to a cleaner that is manually moved by a user, a robot cleaner that autonomously drives, or the like. Hereinafter, the present embodiment will be described with reference to a robot cleaner.

Referring to FIGS. 1 to 16B, a cleaner 100 according to an embodiment of the present invention includes a body 110 having a controller 20. The cleaner 100 includes a first cleaning module 120, which supports the body 110. The cleaner 100 includes a second cleaning module 130, which supports the body 110. The body 110 is supported by the first cleaning module 120 and the second cleaning module 130.

The first cleaning module 120 is provided to perform mopping in contact with the floor. The first cleaning module 120 includes a left spin mop 120a and a right spin mop 120b, which are provided to perform mopping by clockwise or counterclockwise rotation thereof when viewed from the upper side. The left spin mop 120a and the right spin mop 120b are provided so as to be in contact with the floor. The first cleaning module 120 is disposed at the lower side of the body 110. The first cleaning module 120 is disposed at the front of the second cleaning module 130. The cleaner 100 may be configured such that the body 110 is movable with the rotation of the first cleaning module 120 without separate driving wheels. The body 110 may be provided so as to be movable with the rotation of the left spin mop 120a and the right spin mop 120b without separate driving wheels. Herein, the term "driving wheels" indicates driven wheels for moving the body, and excludes auxiliary wheels for supporting the body relative to the floor without being driven.

The first cleaning module 120 includes a pair of spin-mop modules 120. The first cleaning module 120 includes a left spin-mop module 120 having the left spin mop 120a. The first cleaning module 120 includes a right spin-mop module 120 having the right spin mop 120b. The left spin-mop module 120 and the right spin-mop module 120 are provided to perform mopping. Each of the left spin-mop module 120 and the right spin-mop module 120 includes a mop unit 121, a rotating plate 122, a water supply reservoir 123, a spin shaft 128, a spin-drive unit 124, and a driving transmission unit 127. Each of the left spin-mop module 120 and the right spin-mop module 120 further includes a tilting frame 125, a tilting rotating shaft 126, and an elastic member 129. The components included in the first cleaning module 120 may be understood as the components included in each of the left spin-mop module 120 and the right spin-mop module 120.

The second cleaning module 130 is provided so as to be in contact with the floor. The second cleaning module 130 may be provided to perform mopping in contact with the floor. The second cleaning module 130 is disposed at the lower side of the body 110. The second cleaning module 130 is provided so as to be in contact with the floor at the rear of the first cleaning module 120.

In the present embodiment, the second cleaning module 130 is provided so as to perform mopping while rotating. In another example, the second cleaning module 130 may include a mop pad or the like, which performs mopping via sliding on the floor along with the movement of the body 110. In still another example, the second cleaning module 130 may be provided to enable vacuum cleaning.

The second cleaning module 130 may include a rolling member 130a.

The second cleaning module 130 may be provided so as to perform mopping or sweeping while rotating. The rolling member 130a may include a mop unit 131, which mops the floor, or a brush (not illustrated), which sweeps the floor.

In the present embodiment, the rolling member 130a includes the mop unit 131, which sweeps the floor. The mop unit 131 is rotatably provided. The mop unit 131 may rotate about a rotating shaft, which extends substantially in the horizontal direction. The mop unit 131 may rotate about a rotating shaft, which extends substantially in the transverse direction.

In another example, the rolling member 130a may include a brush, which sweeps the floor. The brush may be rotatably provided. The brush may rotate about a rotating shaft, which extends substantially in the horizontal direction. The brush may rotate about a rotating shaft, which extends substantially in the transverse direction. The cleaner 100 may include a dust container, and the brush may be provided to sweep the floor and put impurities having a relatively large volume in the dust container.

Hereinafter, a description will be made with reference to the present embodiment, but a concrete configuration for the cleaning of the second cleaning module 130 may be modified.

The second cleaning module 130 is provided to perform mopping via clockwise or counterclockwise rotation when viewed from one side (the left side or the right side). The cleaner 100 may be provided such that the body 110 is movable via rotation of the second cleaning module 130 without separate driving wheels. The body 110 may be provided so as to be movable via rotation of the rolling member 130a without separate driving wheels.

The cleaner 100 is provided such that the body 110 is movable via rotation of at least one of the first cleaning module 120 and the second cleaning module 130 without separate driving wheels. The body 110 may be moved via only rotation of the first cleaning module 120. The body 110 may be moved via only rotation of the second cleaning module 130. The body 110 may be moved via both rotation of the first cleaning module 120 and rotation of the second cleaning module 130. The cleaner 100 is configured such that the body 110 is moved via rotation of at least one of the left spin mop 120a, the right spin mop 120b, and the rolling member 130a without separate driving wheels.

The cleaner 100 includes a water supply module 150, which supplies water required for mopping. The water supply module 150 may supply water required for the mopping of the first cleaning module 120 or the second cleaning module 130. In the present embodiment, the water supply module 150 supplies water to the first cleaning module 120. The water supply module 150 supplies water to the left spin-mop module 120 and the right spin-mop module 120. The water supply module 150 supplies water to the left spin mop 120a and the right spin mop 120b.

The water supply module 150 includes a water tank 151, which stores therein water to be supplied to the first cleaning module 120 or the second cleaning module 130. In the present embodiment, the water tank 151 stores therein water to be supplied to the first cleaning module 120. The water tank 151 is disposed inside the body 110.

The water supplied by the water supply module 150 reaches the first cleaning module 120 before the floor. The water supplied by the water supply module 150 reaches the left spin mop 120a and the right spin mop 120b before the floor. The water supplied by the water supply module 150 is supplied to the upper surfaces of the left spin mop 120a and the right spin mop 120b, and moves by passing through the left spin mop 120a and the right spin mop 120b.

Each of the first cleaning module 120 and the second cleaning module 130 is provided to mop the floor. In the present embodiment, the first cleaning module 120 is provided to perform wet mopping (mopping in the state in which water is supplied), and the water supply module 150 supplies water to the first cleaning module 120. In addition, in the present embodiment, the second cleaning module 130 is provided to perform dry mopping (mopping in the state in which no water is supplied), and the water supply module 150 does not supply water to the second cleaning module 130. In the present embodiment, the water supply module 150 supplies water to only the first cleaning module 120, among the first cleaning module 120 and the second cleaning module 130. When the cleaner 100 realized as in the present embodiment performs cleaning while moving forward, the second cleaning module 130 may perform dry mopping while moving along the floor surface that has been wet-mopped by the first cleaning module 120.

Hereinafter, a description will be made based on the fact that the first cleaning module 120 performs wet mopping and the second cleaning module 130 performs dry mopping, but the invention is not necessarily limited thereto, and the water supply module 150 may be provided so as to supply water to the second cleaning module 130, instead of the first cleaning module 120, or may be provided so as to supply water to both the first cleaning module 120 and the second cleaning module 130.

The cleaner 100 includes a battery 160 for supplying power. The battery 160 may supply power required for the rotation of the first cleaning module 120. The battery 160 may supply power required for the rotation of the second cleaning module 130.

Figure 11:
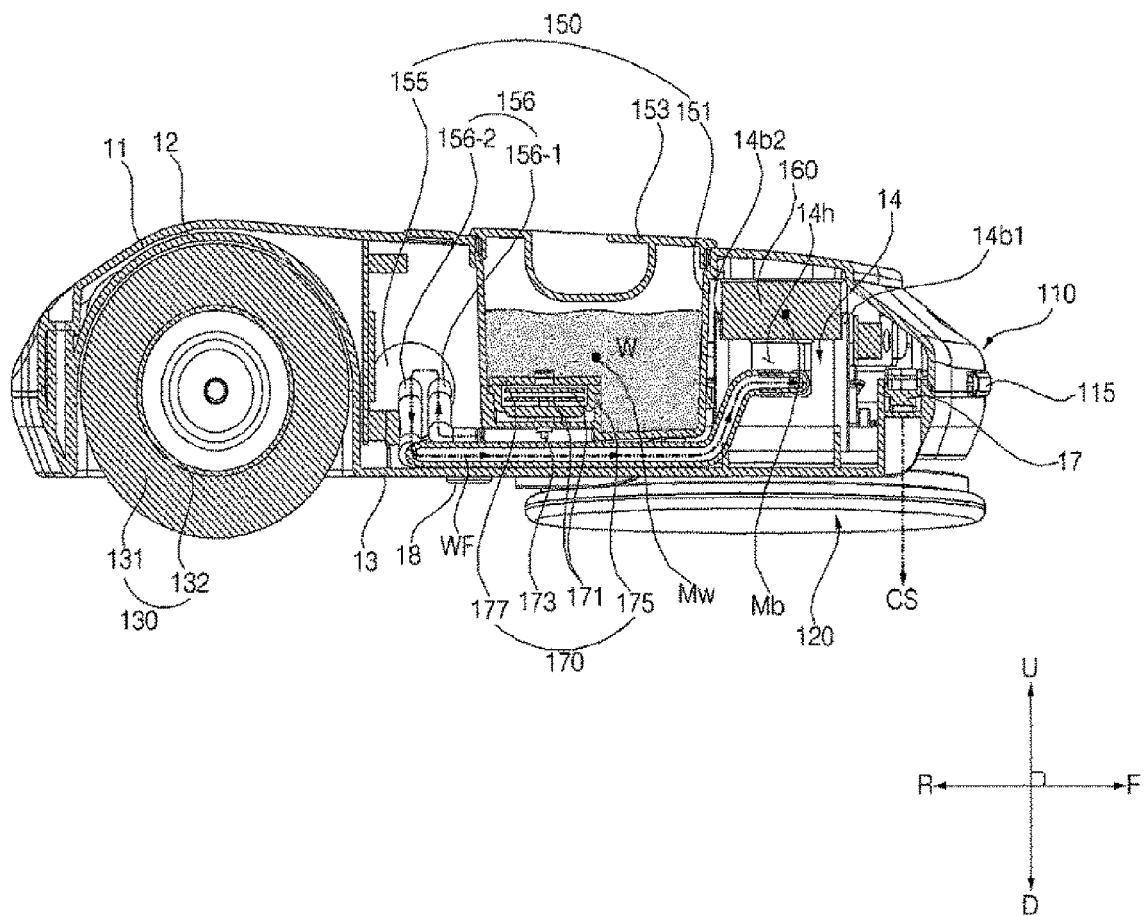
FIG. 11 is a vertical cross-sectional view of the cleaner 100 taken along line S4-S4' of FIG. 6.

Referring to FIG. 11, the center of gravity Mw of the water tank 151 is the center of gravity Mw of the water tank 151 and the water W in the state in which the water tank 151 is filled with the water W. The center of gravity Mw of the water tank 151 may be located closer to the portion of the first cleaning module 120 that is in contact with the floor than to the portion of the second cleaning module 130 that is in contact with the floor in the longitudinal direction. Since the water W has a relatively high specific gravity, among the weight of the body 110, the ratio of the weight transmitted to the first cleaning module 120 to the weight transmitted to the second cleaning module 130 may be increased. Thereby, with regard to the realization of movement of the body 110, rotation of the first cleaning module 120 may become a more important factor than rotation of the second cleaning module 130.

Referring to FIG. 11, the center of gravity Mb of the battery 160 may be located closer to the portion of the first cleaning module 120, which is in contact with the floor, than the portion of the second cleaning module 130, which is in contact with the floor, in the longitudinal direction. Since the battery 160 has a relatively high specific gravity, of the weight of the body 110, a ratio of the weight transmitted to the first cleaning module 120 to the weight transmitted to the second cleaning module 130 may be increased. Thereby, with regard to the realization of the movement of the body 110, rotation of the first cleaning module 120 may become a more important factor than rotation of the second cleaning module 130.

The cleaner 100 includes a case 11 defining the external appearance of the cleaner. The case 11 defines the upper surface, the front surface, the rear surface, the left surface, and the right surface of the body 110. The cleaner 100 includes a base 13, which defines the lower surface of the body 110. The first cleaning module 120 is fixed to the base 13. The second cleaning module 130 is fixed to the base 13. The cleaner 100 includes a rolling member housing 12, which is disposed on the base 13 and is recessed upward from the bottom to accommodate therein the upper portion of the rolling member 130a. The controller 20, the water supply module 150, and the battery 160 are disposed in the inner space defined by the case 11, the base 13, and the rolling member housing 12.

The cleaner 100 includes a water-tank opening/closing member 153 for opening and closing the water tank 151. The water-tank opening/closing member 153 is disposed on the upper surface of the body 110. The cleaner 100 may include a water-level display (not illustrated), which displays the level of water in the water tank 151. The water-level display may be formed of a transparent material to allow the level of water in the water tank 151 within the body 110 to be directly visible.

The cleaner 100 includes a sensing module (not illustrated), which senses the state of the outside. The sensing module may include at least one of a bumper 115, which senses the contact with an external obstacle, an obstacle sensor 16, which senses an external obstacle spaced apart from the cleaner, and a cliff sensor 17, which senses the presence or absence of a cliff on the driving plane (floor). The sensing module may include an image sensor (not illustrated), which senses an external image. The cleaner 100 may be provided so as to move autonomously. The robot cleaner 100, which drives autonomously using sensing information of the sensing module, may be realized.

The cleaner 100 includes the obstacle sensor 16, which senses an obstacle at the front of the cleaner. The obstacle sensor 16 may include a plurality of obstacle sensors 16a, 16b and 16c. The obstacle sensor 16 is disposed on the front surface of the body 110.

The cleaner 100 includes the cliff sensor 17, which senses the presence or absence of a cliff on the floor within a cleaning zone. The cliff sensor 17 may include a plurality of cliff sensors 17a, 17b and 17c. The cliff sensor 17a may sense the presence or absence of a cliff at the front of the first cleaning module 120. The cliff sensors 17b and 17c may sense the presence or absence of a cliff at the rear of the second cleaning module 130. Referring to FIG. 11, the cliff sensor 17 transmits a sensing signal in a downward direction CS to sense the presence or absence of a cliff at a corresponding position. The cliff sensor 17a senses the presence or absence of a cliff in the area at the front of the lowest points Pla and Plb of the first cleaning module 120. The cliff sensors 17b and 17c sense the presence or absence of a cliff in the area at the rear of the lowest point (the portion in contact with the floor) of the second cleaning module 130.

The cleaner 100 may include a power switch (not illustrated) for inputting the ON/OFF of the supply of power. The cleaner 100 may include an input unit (not illustrated) capable of inputting various user instructions. The cleaner 100 may include a communication module (not illustrated) for performing communication with an external device.

The cleaner 100 includes an ultraviolet LED 18, which emits ultraviolet light downward. The ultraviolet LED 18 is disposed between the first cleaning module 120 and the second cleaning module 130. The ultraviolet LED 18 is disposed on the lower surface of the body 110 to outwardly emit ultraviolet light to the floor surface. The ultraviolet LED 18 is disposed on the lower surface of the base 13. The ultraviolet LED 18 may include a plurality of ultraviolet LEDs 18a and 18b. The ultraviolet LEDs 18a and 18b include an ultraviolet LED 18a disposed between the left spin mop 120a and the rolling member 130a and an ultraviolet LED 18b disposed between the right spin mop 120b and the rolling member 130a. Thereby, when the cleaner 100 performs cleaning while moving forward, the ultraviolet LEDs 18 may exert a sterilization function by emitting ultraviolet light while moving along the floor surface mopped by the first cleaning module 120, and the second cleaning module 130 may perform cleaning while moving along the floor surface irradiated with ultraviolet light.

The cleaner 100 may include a communication module (not illustrated), which is connectable to a predetermined network. Depending on the communication protocol, the communication module may be implemented using a wireless communication technique such as IEEE 802.11 WLAN, IEEE 802.15 WPAN, UWB, Wi-Fi, ZigBee, Z-wave, or Blue-tooth. For example, the communication module may include an ultra-wideband (UWB) communication sensor or the like to recognize the current position of the cleaner 100 in a room.

The cleaner 100 may include an inertial sensor unit (IMU) (not illustrated). The cleaner 100 may stabilize driving motion based on information of the inertial sensor unit.

The cleaner 100 includes the controller 20, which controls autonomous driving. The controller 20 may control driving of the cleaner upon receiving a sensing signal of the sensing module. The controller 20 may process a sensing signal of the obstacle sensor 16. The controller 20 may process a sensing signal of the cliff sensor 17. The controller 20 may process a sensing signal of the bumper 151. The controller 20 may process a sensing signal of the UWB sensor and the inertial sensor unit. The controller 20 may process a signal of the input unit or a signal input via the communication module. The controller 20 may control the water supply module 150. The controller 20 may control a pump 155 so as to adjust the amount of water to be supplied. Through the control of the pump 155, the amount of water to be supplied to the first cleaning module 120 per unit time may be changed. In another example, the controller 20 may control a valve, which will be described below, so as to change whether or not water is supplied. The controller 20 includes a printed circuit board (PCB) 20 disposed inside the body 110 (see FIGS. 15A and 16B).

The body 110 defines the external appearance of the cleaner. The body 110 includes a first section 111 disposed at the upper side of the first cleaning module 120 and a second section 112 disposed at the upper side of the second cleaning module 130 (see FIG. 5). The first section 111 and the second section 112 are integrally formed with each other. The lower surface of the body 110 between the first cleaning module 120 and the second cleaning module 130 is recessed upward to form a body gap 110c. The body gap 110c may be disposed between the first section 111 and the second section 112. The body gap 110c may be recessed in each of the left and right surfaces of the body 110.

The body 110 includes the bumper 115, which senses external shocks. The bumper 115 is disposed at the upper side of the rotating plate 122 of the first cleaning module 120. The bumper 115 is disposed at the front lateral side of the body 110. The bumper 115 includes a plurality of bumpers 115a and 115b. The bumper 115a is disposed at the front left side of the left spin-mop 120a, and the bumper 115b is disposed at the front right side of the right spin-mop 120b.

The cleaner 100 includes a contact piece 1151, which is disposed on the edge of the body 110 so as to come into contact with an external object. The contact piece 1151 is shaped so as to bend from the front side to the lateral side. The cleaner 100 includes a bumper switch 1152, which is provided to sense that the contact piece 1151 is pushed by an external object. The bumper switch 1152 may be provided so as to be pushed by the contact piece 1151 as the contact piece 1151 is moved. The bumper switch 1152 may include a first bumper switch 1152a, which is disposed on the back of a front portion of the contact piece 1151. The bumper switch 1152 may include a second bumper switch 1152b, which is disposed inside a lateral portion of the contact piece 1151. When the bumper switch 1152 is pushed rearward, the first bumper switch 1152a is pushed. When the bumper switch 1152 is pushed laterally, the second bumper switch 1152b is pushed.

The body 110 includes the case 11 and the base 13, which define the external appearance of the cleaner.

The base 13 has an opening in which the tilting frame 125 is disposed. The tilting frame 125 is connected to the base 13 via the tilting rotating shaft 126. The tilting rotating shaft 126 is rotatably fixed to the base 13.

The base 13 includes a limit, which limits the rotational range of the tilting frame 125. The limit may include an upper-end limit 13d and a lower-end limit 13f.

The base 13 includes the upper-end limit 13d, which limits the upward rotational range of the tilting frame 125. A left upper-end limit 13d may be disposed on the left side of a left tilting frame 125. A right upper-end limit 13d may be disposed on the right side of a right tilting frame 125. The left upper-end limit 13d is disposed so as to be brought into contact with an upper-end-limit contact portion 125f of the left spin-mop module 120. The right upper-end limit 13d is disposed so as to be brought into contact with an upper-end-limit contact portion 125f of the right spin-mop module 120. The upper-end-limit contact portion 125f may be disposed on the tilting frame 125. In the state in which the cleaner 100 is normally disposed on the external horizontal plane, the upper-end-limit contact portion 125f is in contact with the upper-end limit 13d, and the inclination angle Ag1 or Ag2 reaches the minimum value.

The base 13 includes the lower-end limit 13f, which limits the downward rotational range of the tilting frame 125. The lower-end limit 13f forms the upper surface. The lower-end limit 13f may be disposed on the inner surface of the base 13. The lower-end limit 13f may be disposed at the lower side of the spin-drive unit 124. The lower-end limit 13f is provided so as to be brought into contact with a lower-end-limit contact portion 120f in the state in which the tilting frame 125 is rotated downward to the maximum extent. The lower-end-limit contact portion 120f may be disposed on the lower surface of the spin-drive unit 124. In the state in which the cleaner 100 is normally disposed on the external horizontal plane, the lower-end-limit contact portion 120f is spaced apart from the lower-end limit 13f. In the state in which no upward push force is applied to the lower surface of the spin mop 120a or 120b, the tilting frame 125 is rotated to the maximum angle, the lower-end-limit contact portion 120f is brought into contact with the lower-end limit 13f, and the inclination angle Ag1 or Ag2 reaches the maximum value.

The base 13 includes a second support portion 13b, which fixes the end of the elastic member 129. When the tilting frame 125 is rotated, the elastic member 129 is elastically deformed or elastically restored by a first support portion 125d, which is fixed to the tilting frame 125, and the second support portion 13b, which is fixed to the base 13.

The base 13 includes a tilting-rotating-shaft support portion 13c, which supports the tilting rotating shaft 126. The tilting-rotating-shaft support portion 13c supports opposite ends of the tilting rotating shaft 126.

The base 13 may include a separate support member 13a, which supports the tilting frame 125. The support member 13a may be provided as a separate component from the other portion of the base 13. The support member 13a extends along the edge of the opening formed in the lower surface of the base 13. The support member 13a may form the opening in the center portion thereof, and the tilting frame 125 may be disposed in the opening.

The support member 13a may include the second support portion 13b. The support member 13a may include the tilting-rotating-shaft support portion 13c. The support member 13a may include the upper-end limit 13d. The support member 13a includes a support member fixing portion 13e coupled to the other portion of the base 13.

Referring to FIGS. 2 to 6, FIGS. 9 to 11, and FIG. 19, the second cleaning module 130 is provided so as to be in contact with the floor at the rear of the first cleaning module 120. The second cleaning module 130 is provided to perform mopping in contact with the floor along with the movement of the body 110. The second cleaning module 130 is provided to perform dry mopping.

The second cleaning module 130 may include the rolling member 130a, which rotates about a horizontally extending rotational axis Or. In the present embodiment, the rotational axis Or extends in the transverse direction, but, in another embodiment, the rotational axis Or may extend in the longitudinal direction, or may extend in a direction between the transverse direction and the longitudinal direction. Thereby, movement force may be applied in the horizontal direction (in the direction perpendicular to the rotational axis Or) to the body 110 via rotation of the rolling member 130a. When additional movement force by the rolling member 130a is added to the movement force applied to the body 110 by the first cleaning module 120, more various driving motions of the cleaner 100 become possible.

In the present embodiment, the second cleaning module 130 includes the rolling member 130a, which rotates about the rotational axis Or, which extends in the transverse direction. The rolling member 130a may rotate about the rotational axis Or, which extends in a direction parallel to the direction in which the left spin mop 120a and the right spin mop 120b are arranged. Thereby, movement force may be applied to the body 110 in the longitudinal direction via rotation of the rolling member 130a. When additional movement force applied in the longitudinal direction by the rolling member 130a is added to the movement force applied to the body 110 by the first cleaning module 120, more various and efficient driving motions of the cleaner 100 become possible. A detailed description related to various driving motions will follow.

Figure 6:
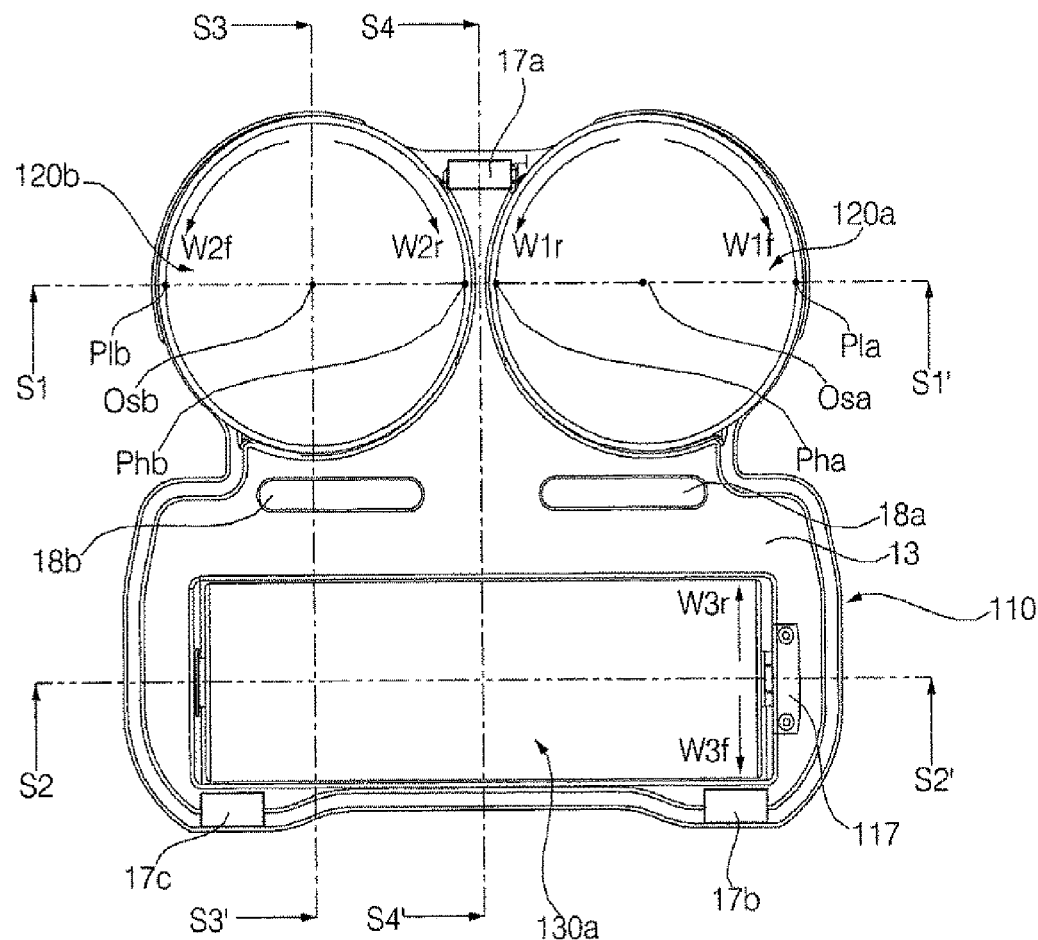
FIG. 6 is a bottom view of the cleaner 100 of FIG. 1.
Figure 7:
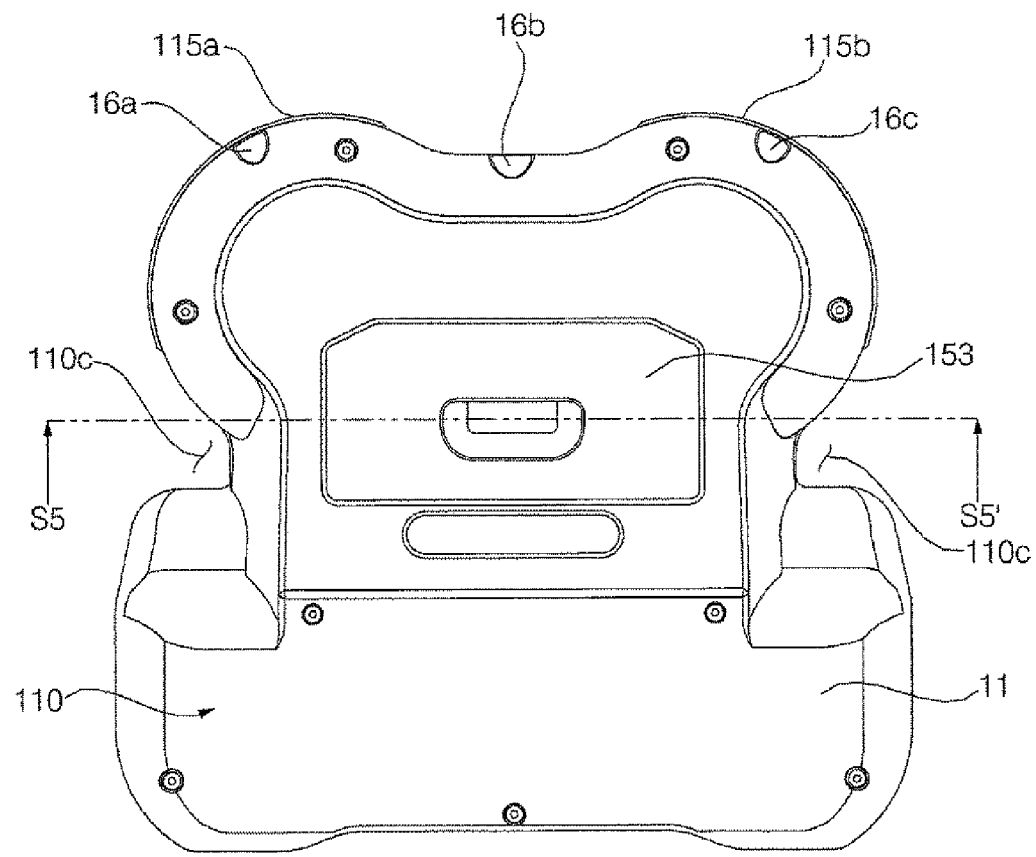
FIG. 7 is a top view of the cleaner 100 of FIG. 1.
Figure 7:
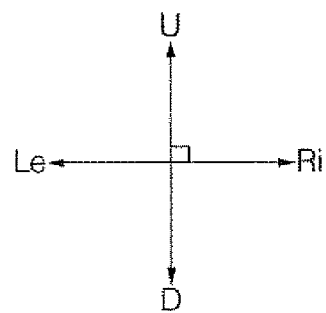
Figure 10:
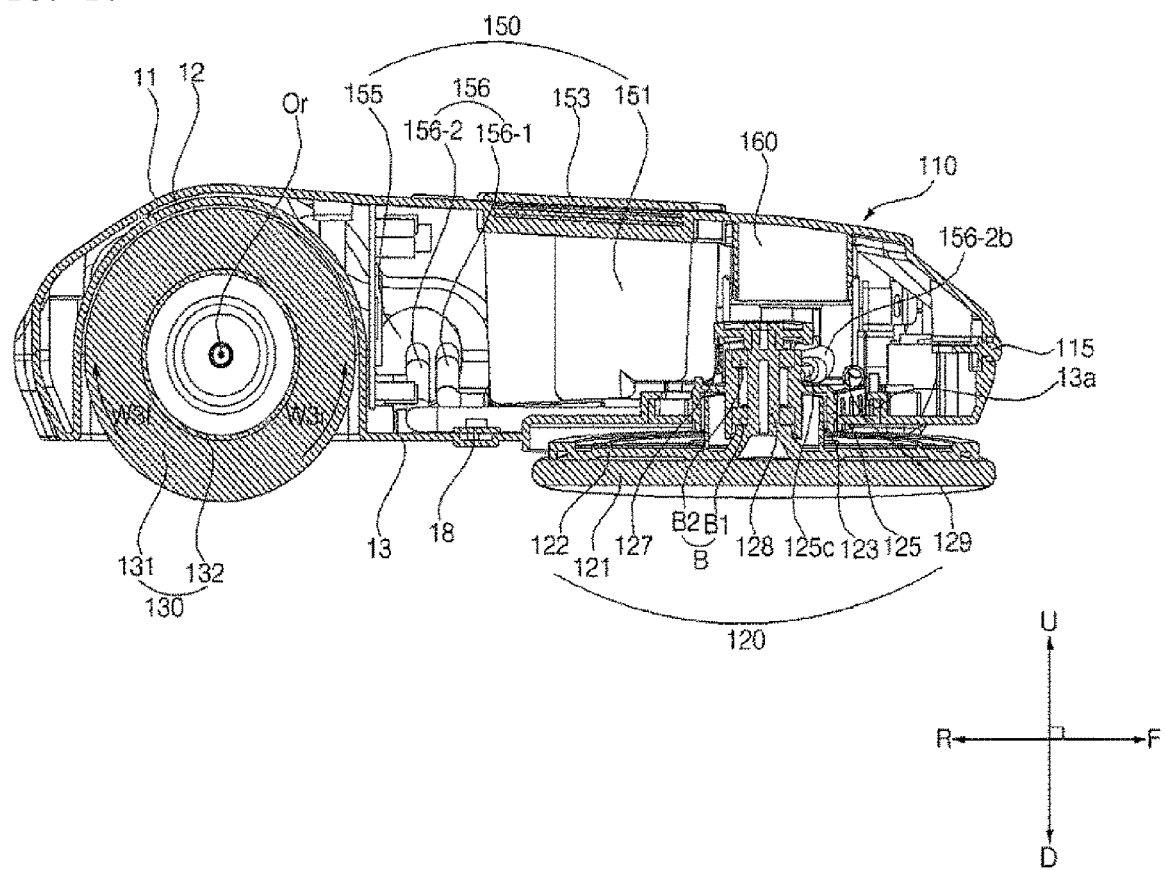
FIG. 10 is a vertical cross-sectional view of the cleaner 100 taken along line S3-S3' of FIG. 6.

Referring to FIGS. 6 and 10, among the rotation directions of the rolling member 130a when viewed from the right side, the clockwise direction is defined as a third forward direction w3f, and the counterclockwise direction is defined as a third reverse direction w3r.

When the cleaner 100 moves forward, the rolling member 130a performs mopping while following the floor surface that has been cleaned by the first cleaning module 120. The rolling member 130a may perform dry mopping, and may remove moisture from the floor surface that has undergone wet mopping by the left spin mop 120a and the right spin mop 120b. In the present embodiment, the second cleaning module 130 includes a single rolling member 130a, but, in another embodiment, the second cleaning module 130 may include a plurality of rolling members. The plurality of rolling members may respectively rotate about a plurality of rotational axes, which are parallel to each other.

The second cleaning module 130 includes the mop unit 131 or the brush. A part of the weight of the body 110 may be transmitted to the floor through the mop unit 131 or the brush. The mop unit 131 or the brush is disposed so as to surround the periphery of a rotating member 132. The mop unit 131 or the brush is disposed along the periphery about the rotational axis Or. The mop unit 131 or the brush may be fixedly coupled to the rotating member 132, or may be separably fixed to the rotating member 132.

In the present embodiment, the second cleaning module 130 includes the mop unit 131. A part of the weight of the body 110 is transmitted to the floor through the mop unit 131. The mop unit 131 is disposed so as to surround the periphery of the rotating member 132. The mop unit 131 is disposed along the periphery about the rotational axis Or. The mop unit 131 may be fixedly coupled to the rotating member 132, or may be separably fixed to the rotating member 132.

The second cleaning module 130 includes the rotating member 132, which is rotatably provided.

The rotating member 132 serves to fix the mop unit 131 or the brush of the rolling member 130a. The rotating member 132 may integrally rotate the mop unit 131 or the brush.

In the present embodiment, the rotating member 132 fixes the mop unit 131 of the rolling member 130a. The rotating member 132 may integrally rotate the mop unit 131.

The rotating member 132 rotates upon receiving drive force of a rolling-drive unit 137. The rotating member 132 rotates about the rotational axis Or.

The rotating member 132 has a cylindrical shape. The rotating member 132 is elongated in the direction in which the rotational axis Or extends. The rotating member 132 defines therein a hollow region 132s. The mop unit 131 is fixed to the outer peripheral surface of the rotating member 132.

The second cleaning module 130 includes a first shaft portion 134, which is disposed on one end of the rotating member 132. The second cleaning module 130 includes a second shaft portion 135, which is disposed on the other end of the rotating member 132. The first shaft portion 134 and the second shaft portion 135 are disposed respectively on opposite ends of the second cleaning module 130 in the extending direction of the rotational axis Or. In the present embodiment, the first shaft portion 134 is disposed on the right end of the rotating member 132, and the second shaft portion 135 is disposed on the left end of the rotating member 132. One end of the rotating member 132 is inwardly recessed, and the first shaft portion 134 is disposed in the recessed portion of the one end of the rotating member 132. The other end of the rotating member 132 is inwardly recessed, and the second shaft portion 135 is disposed in the recessed portion of the other end of the rotating member 132.

The first shaft portion 134 interconnects one end of the rotating member 132 and the body 110. The first shaft portion 134 is fixedly connected to the rotating member 132. The first shaft portion 134 is formed so as to protrude in the direction of the rotational axis Or. In the present embodiment, the first shaft portion 134 protrudes rightward. The first shaft portion 134 is inserted into a recess formed in a drive force transmitter 137a so as to integrally rotate when the drive force transmitter 137a rotates. The cross section of the first shaft portion 134, which is perpendicular to the rotational axis Or, has a shape (e.g. a polygonal shape) other than a circular shape, and the recess in the drive force transmitter 137a is recessed into a shape corresponding to the first shaft portion 134.

The second shaft portion 135 interconnects the other end of the rotating member 132 and the body 110. The second shaft portion 135 is rotatably connected to the rotating member 132. The second shaft portion 135 is formed so as to protrude in the direction of the rotational axis Or. In the present embodiment, the second shaft portion 135 protrudes leftward. The second shaft portion 135 is inserted into and fixed to recesses formed in the body 110 and a coupler 117. When the first shaft portion 134 is rotated by the drive force transmitter 137a, the rotating member 132 and the mop unit 131 integrally rotate with the first shaft portion 134, and the second shaft portion 135 is fixed so as to rotate relative to the rotating member 132. A bearing may be disposed between the second shaft portion 135 and the rotating member 132. The cross section of the second shaft portion 135, which is perpendicular to the rotational axis Or, has a shape (e.g. a polygonal shape) other than a circular shape, and the recess in the body 110 and/or the coupler 117 is recessed into a shape corresponding to the second shaft portion 135.

The second cleaning module 130 includes the rolling-drive unit 137, which provides drive force for the rotation of the rolling member 130a. The rolling-drive unit 137 provides drive force to rotate the rotating member 132. The rolling-drive unit 137 includes a motor 137d. The motor 137d is disposed inside the body 110. The rolling-drive unit 137 includes a gear assembly 137c, which transmits the torque of the motor 137d. The gear assembly 137c includes a plurality of gears, which are engaged and rotated with each other. For example, the plurality of gears may include a driving gear, which integrally rotates with a shaft of the motor 137d, and a driven gear, which is engaged and rotated with the driving gear. A plurality of driven gears may be provided so as to be engaged and rotated with each other. The rolling-drive unit 137 may include a shaft 137b, which integrally rotates with any one driven gear. The rolling-drive unit 137 may include the drive force transmitter 137a, which transmits the torque to the first shaft portion 134. The shaft 137b transmits the torque of the corresponding driven gear to the drive force transmitter 137a. The drive force transmitter 137a has the recess into which the first shaft portion 134 is inserted. The shaft 137b, the drive force transmitter 137a, and the first shaft portion 134 integrally rotate with each other.

The cleaner 100 may include the coupler 117, which is separably coupled to the body 110. The coupler 117 is disposed on the base 13. The coupler 117 supports the lower end of the second shaft portion 135. The second shaft portion 135 is supported by the base 13. The second shaft portion 135 may have the recess into which the second shaft portion 135 is inserted. The rotating member 132 and the mop unit 131 may be removed from the body 110, or may be coupled to the body 110, using the coupler 117. For example, in the state in which the coupler 117 is removed, one of opposite ends of the rotating member 132, on which the second shaft portion 135 is disposed, may be pulled out of the body 110, and then the first shaft portion 134 may be easily pulled out from the drive force transmitter 137a. On the contrary, in the state in which the coupler 117 is removed, the distal end of the first shaft portion 134 may first be inserted into the recess in the drive force transmitter 137a, and then the second shaft portion 135 and the coupler 117 may be inserted into the body 110. In order to maintain the state in which the rotating member 132 is coupled to the body 110, the user may fix the coupler 117 to the body 110. In addition, in order to separate the rotating member 132 from the body 110, the user may separate the coupler 117 from the body 110.

Referring to FIGS. 1 to 6, FIGS. 8 and 10, and FIGS. 12 to 23, the first cleaning module 120 includes the left spin mop 120a and the right spin mop 120b, which are in contact with the floor while rotating in the clockwise direction or in the counterclockwise direction when viewed from the upper side. The first cleaning module 120 is provided to perform mopping via rotation of the left spin mop 120a and the right spin mop 120b.

Among the components of the first cleaning module 120, a component in which "left" is affixed to the front of the name thereof is a component of the left spin mop 120a, and a component in which "right" is affixed to the front of the name thereof is a component for operating the right spin mop 120*b*. In a description related to the components of the first cleaning module 120, when it is unnecessary to distinguish "left" and "right" from each other, the corresponding description may be applied to both "left" and "right".

Referring to FIG. 6, the point at which the rotational axis of the left spin mop 120*a* and the lower surface of the left spin mop 120*a* cross each other is defined as the rotation center Osa of the left spin mop 120*a*, and the point at which the rotational axis of the right spin mop 120*b* and the lower surface of the right spin mop 120*b* cross each other is defined as the rotation center Osb of the right spin mop 120*b*. Among the rotation directions of the left spin mop 120*a* when viewed from the lower side, the clockwise direction is defined as a first forward direction w1*f*, and the counterclockwise direction is defined as a first reverse direction w1*r*. Among the rotation directions of the right spin mop 120*b* when viewed from the lower side, the counterclockwise direction is defined as a second forward direction w2*f*, and the clockwise direction is defined as a second reverse direction w2*r*.

Referring to FIG. 6, when the left spin mop 120*a* rotates, the point Pla on the lower surface of the left spin mop 120*a*, which receives the largest frictional force from the floor, is disposed on the left side of the rotation center Osa of the left spin mop 120*a*. A greater weight may be transmitted to the floor surface from the point Pla on the lower surface of the left spin mop 120*a* than at any other point so as to generate the largest friction force at the point Pla. In the present embodiment, the point Pla is disposed directly to the left of the rotation center Osa, but, in another embodiment, the point Pla may be disposed leftward and to the front side or the rear side of the rotation center Osa.

Referring to FIG. 6, when the right spin mop 120*b* rotates, the point Plb on the lower surface of the right spin mop 120*b*, which receives the largest frictional force from the floor, is disposed on the right side of the rotation center Osb of the right spin mop 120*b*. A greater weight may be transmitted to the floor surface from the point Plb on the lower surface of the right spin mop 120*b* than at any other point so as to generate the largest friction force at the point Plb. In the present embodiment, the point Plb is disposed directly to the right of the rotation center Osb, but, in another embodiment, the point Plb may be disposed rightward and to the front side or the rear side of the rotation center Osb.

The point Pla and the point Plb are bilaterally symmetrically disposed to each other.

In order to make the point Pla be the point on the lower surface of the left spin mop 120*a* that receives the largest frictional force from the floor (or to make the point Plb be the point on the lower surface of the right spin mop 120*b* that receives the largest frictional force from the floor), various embodiments may be implemented as follows.

Figure 3A:
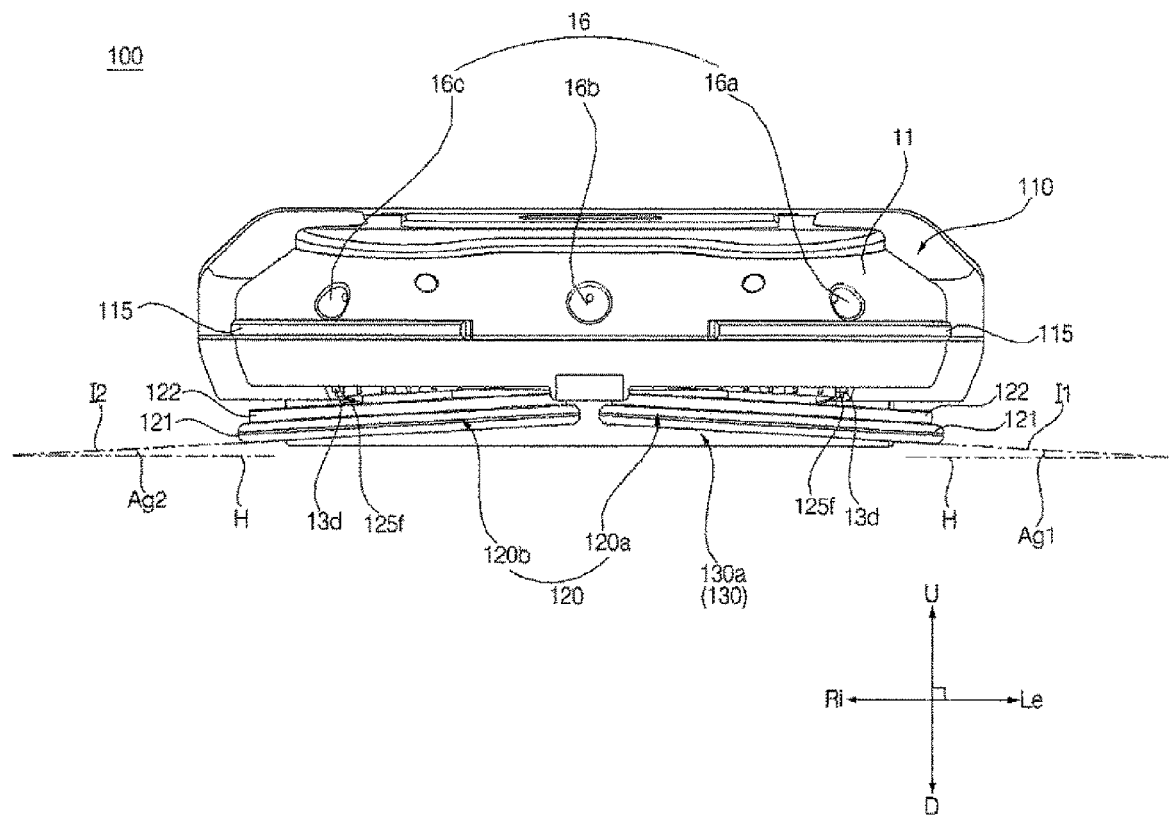
FIG. 3A is a front elevational view of the cleaner 100 of FIG. 1.

In an embodiment with reference to FIG. 3A, the lower surface of the left spin mop 120*a* may be disposed so as to be inclined downward in the direction from the rotation center Osa to the point Pla. In this case, the point Pla is the lowest point Pla on the lower surface of the left spin mop 120*a*. In this case, "the angle of the lower surface I1 of the left spin mop 120*a* relative to the virtual horizontal plane H" and "the angle of the lower surface I2 of the right spin mop 120*b* relative to the virtual horizontal plane H" are defined as inclination angles Ag1 and Ag2. The angle of the lower surface I1 of the left spin mop 120*a* relative to the external horizontal plane H is the inclination angle Ag1, and the angle of the lower surface I2 of the right spin mop 120*b* relative to the external horizontal plane H is the inclination angle Ag2. The two inclination angles Ag1 and Ag2 may be the same.

Figure 3B:
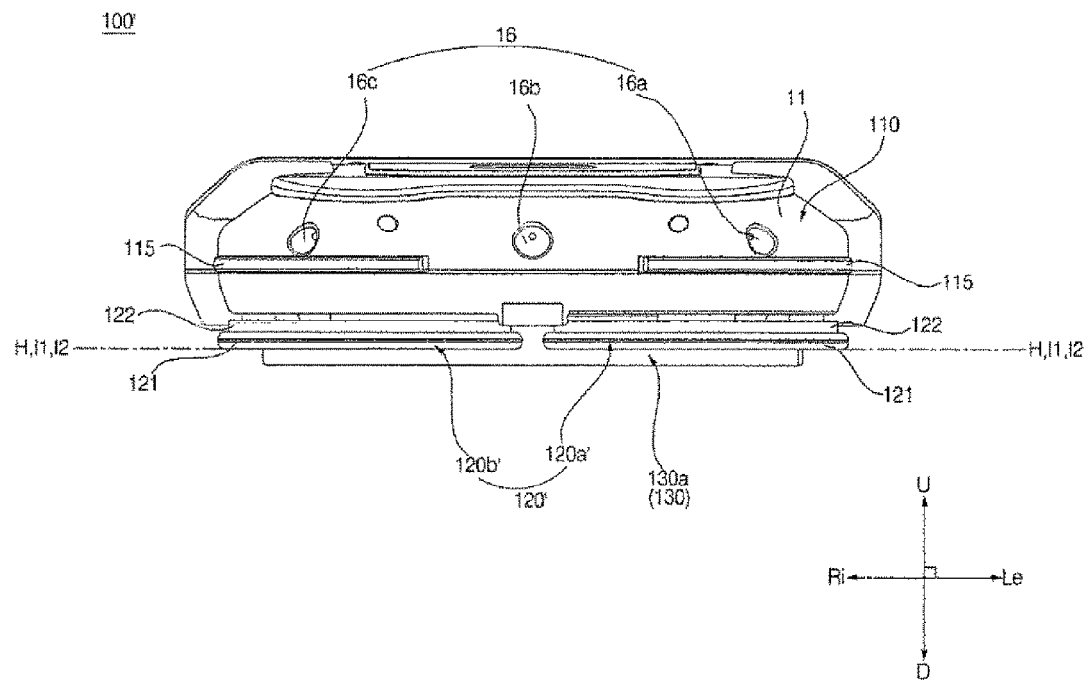
FIG. 3B is a front elevational view of a cleaner 100' according to another embodiment of the present invention.
Figure 4:
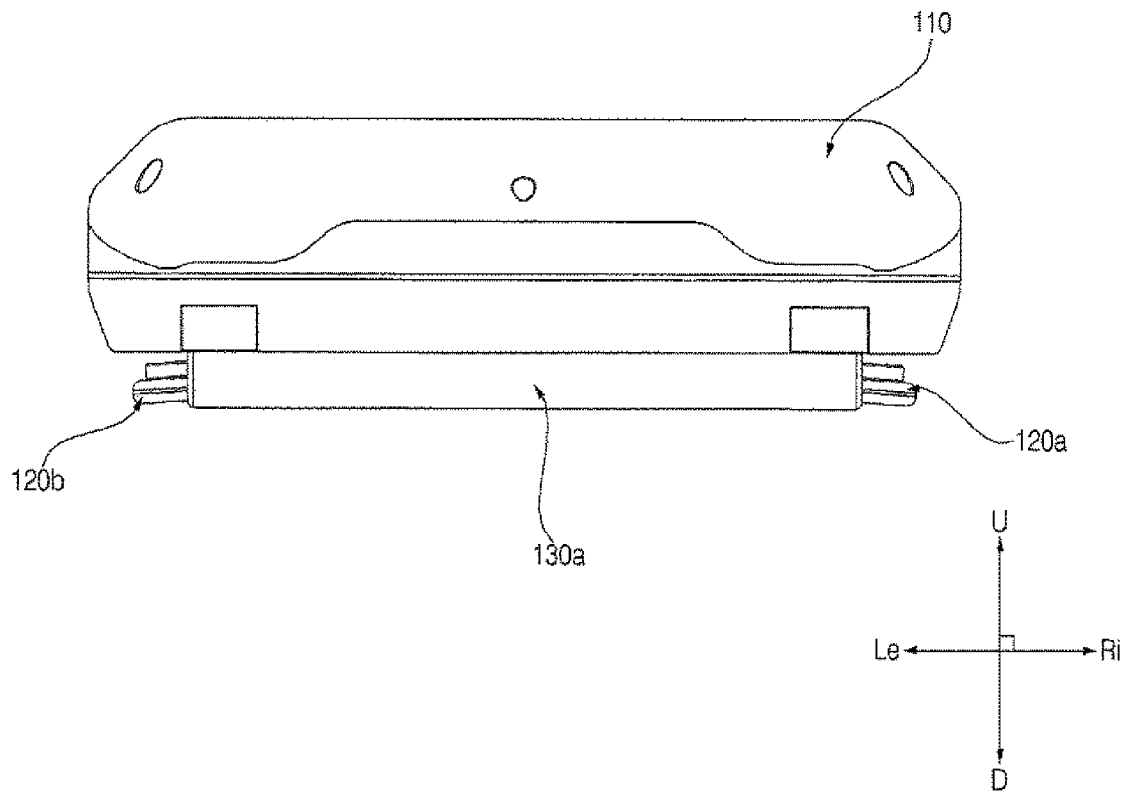
FIG. 4 is a rear elevational view of the cleaner 100 of FIG. 1.
Figure 5:
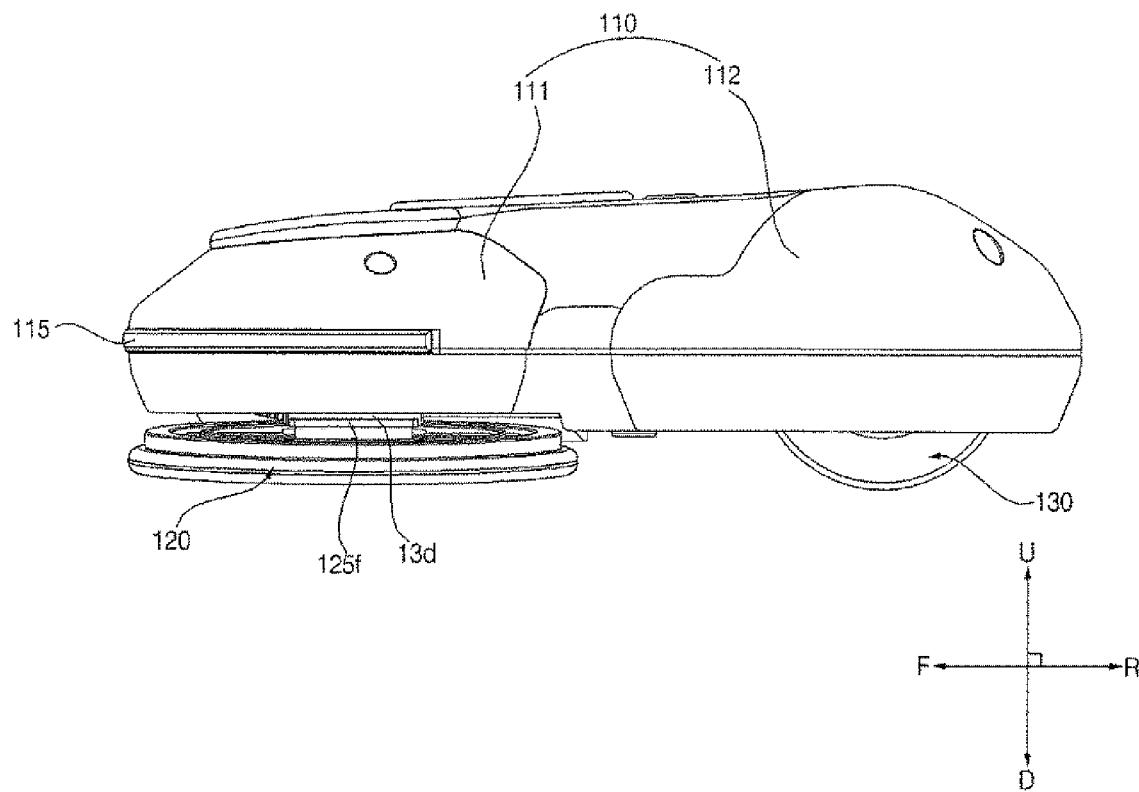
FIG. 5 is a (left) side elevational view of the cleaner 100 of FIG. 1.

In an embodiment with reference to FIG. 3B, the lower surface of the left spin mop 120*a* may be horizontally disposed. Through the use of an elastic member, a moment may be applied to the left spin mop 120*a*. The moment applied to the left spin mop 120*a* is a clockwise moment when viewed from the front side. In this case, even if the left spin mop 120*a* is horizontally disposed relative to the external horizontal plane H, the point Pla is most strongly close contact with the external horizontal plane H, thereby generating the largest frictional force. First and second concrete embodiments for this are as follows.

In the first embodiment, the first cleaning module 120 may be disposed on the tilting frame 125, which will be described below, and the moment may be applied to the first cleaning module 120 by the elastic force of the elastic member 129, which will be described below. As illustrated in FIG. 3B, the lower surface of the spin mop 120*a* or 120*b* is disposed parallel to the horizontal plane H in the state in which an upper-end-limit contact portion 125*f* is in contact with an upper-end limit 13*d*. Specifically, the elastic member 129 is most largely elastically deformed in the horizontal state of the left spin mop 120*a*, and the degree of elastic deformation of the elastic member 129 is reduced in the state in which the point Pla of the left spin mop 120*a* is located lower than any other point.

In the second embodiment, a plurality of springs (not illustrated) may be arranged in the rotation direction about the rotational axis on the upper surface of a lower rotating plate (not illustrated), to which the lower surface of the left spin mop 120*a* is fixed. In this case, an upper rotating plate (not illustrated), which supports the upper ends of the respective springs, may be disposed so as to be inclined downward in the direction from the rotation center Osa to the point Pla. When the upper rotating plate rotates, the springs also rotate and repeat elastic compression and elastic restoration respectively. At this time, among the plurality of springs, the spring disposed toward the point Pla on the basis of the rotation center Osa is compressed to the largest extent, and thus the point Pla on the lower surface of the left spin mop 120*a* receives the largest frictional force from the floor.

In order to make the point Plb on the lower surface of the right spin mop 120*b* be the point that receives the largest frictional force from the floor, the above-described embodiment, the first embodiment, and the second embodiment may be applied in the same manner by those skilled in the art. Hereinafter, a description will be made with reference to the above-described embodiment (see FIG. 3A).

The lower surface of the left spin mop 120*a* and the lower surface of the right spin mop 120*b* are disposed so as to be inclined respectively. The inclination angle Ag1 of the left spin mop 120*a* and the inclination angle Ag2 of the right spin mop 120*b* are acute angles. In the present embodiment, the inclination angles Ag1 and Ag2 are respectively about 3-6 degrees. The inclination angles Ag1 and Ag2 may be set to a small value required to cause the entire lower surface of the mop unit 121 to be brought into contact with the floor via rotation of the left spin mop 120*a* and the right spin mop 120*b* while ensuring that the largest frictional force point is the point Pla or Plb.

The lower surface of the left spin mop 120*a* may be inclined downward and leftward. The lower surface of the right spin mop 120*b* may be inclined downward and rightward. Referring to FIG. 6, the lowest point Pla is formed on the left portion of the lower surface of the left spin mop 120a. The highest point Pha is formed on the right portion of the lower surface of the left spin mop 120a. The lowest point Plb is formed on the right portion of the lower surface of the right spin mop 120b. The highest point Phb is formed on the left portion of the lower surface of the right spin mop 120b.

Referring to FIG. 6, the movement of the cleaner 100 is realized by the frictional force generated between the first cleaning module 120 and/or the second cleaning module 130 and the floor.

The first cleaning module 120 may generate "forward movement frictional force" to move the body 110 forward or "rearward movement frictional force" to move the body 110 rearward. The first cleaning module 120 may generate "leftward moment frictional force" to turn the body 110 to the left or "rightward moment frictional force" to turn the body 110 to the right. The first cleaning module 120 may generate the combined frictional force of any one of the forward movement frictional force and the rearward movement frictional force and any one of the leftward moment frictional force and the rightward moment frictional force.

The second cleaning module 130 may generate "forward movement frictional force" to move the body 110 forward or "rearward movement frictional force" to move the body 110 rearward.

In order for the first cleaning module 120 to generate the forward movement frictional force, the left spin mop 120a may be rotated in the first forward direction w1f by a predetermined rpm R1, and the right spin mop 120b may be rotated in the second forward direction w2f by the predetermined rpm R1.

In order for the second cleaning module 130 to generate the forward movement frictional force, the rolling-mop 130a may be rotated in the third forward direction w3f.

In order for the first cleaning module 120 to generate the rearward movement frictional force, the left spin mop 120a may be rotated in the first reverse direction w1r by a predetermined rpm R2, and the right spin mop 120b may be rotated in the second reverse direction w2r by the predetermined rpm R2.

In order for the second cleaning module 130 to generate the rearward movement frictional force, the rolling-mop 130a may be rotated in the third reverse direction w3r.

In order for the first cleaning module 120 to generate the rightward moment frictional force, the left spin mop 120a may be rotated in the first forward direction w1f by a predetermined rpm R3, and the right spin mop 120b may be operated as follows: (i) it may be rotated in the second reverse direction w2r; (ii) it may be stopped without rotation; or (iii) it may be rotated in the second forward direction w2f by a predetermined rpm R4, which is smaller than the rpm R3.

In order for the first cleaning module 120 to generate the leftward moment frictional force, the right spin mop 120b may be rotated in the second forward direction w2f by a predetermined rpm R5, and the left spin mop 120a may be operated as follows: (i) it may be rotated in the first reverse direction w1r; (ii) it may be stopped without rotation; or (iii) it may be rotated in the first forward direction w1f by a predetermined rpm R6, which is smaller than the rpm R5.

The body 110 may be moved or may be positioned in place by the combined frictional force of the frictional force generated by the first cleaning module 120 and the frictional force generated by the second cleaning module 130.

In order to move the cleaner 100 forward in a straight line, both the first cleaning module 120 and the second cleaning module 130 may generate forward movement frictional force. In another example, one of the first cleaning module 120 and the second cleaning module 130 may generate forward movement frictional force and the other remaining one thereof may remain stationary without rotation. In a further example, one of the first cleaning module 120 and the second cleaning module 130 may generate relatively large forward movement frictional force and the other remaining one thereof may generate relatively small rearward movement frictional force.

In order to move the cleaner 100 rearward in a straight line, both the first cleaning module 120 and the second cleaning module 130 may generate rearward movement frictional force. In another example, one of the first cleaning module 120 and the second cleaning module 130 may generate rearward movement frictional force and the other remaining one thereof may remain stationary without rotation. In a further example, one of the first cleaning module 120 and the second cleaning module 130 may generate relatively large rearward movement frictional force and the other remaining one thereof may generate relatively small forward movement frictional force.

In order to turn the cleaner 100 to the right side, the first cleaning module 120 may generate rightward moment frictional force, and the rolling member 130a may be operated as follows: (i) it may be rotated in the third forward direction w3f; (ii) it may be stopped without rotation; and (iii) it may be rotated in the third reverse direction w3r.

In order to turn the cleaner 100 to the left side, the first cleaning module 120 may generate leftward moment frictional force, and the rolling member 130a may be operated as follows: (i) it may be rotated in the third forward direction w3f; (ii) it may be stopped without rotation; and (iii) it may be rotated in the third reverse direction w3r.

In order to maintain the cleaner 100 in place, both the first cleaning module 120 and the second cleaning module 130 may remain stationary without rotation. In another example, one of the first cleaning module 120 and the second cleaning module 130 may generate forward movement frictional force and the other one may generate rearward movement frictional force having the same magnitude as the forward movement frictional force. In particular, in the latter case, each of the first cleaning module 120 and the second cleaning module 130 may perform mopping of a given floor surface while rotating in the state in which the body 110 is located in place.

With reference to concrete driving control examples of the body 110 described above, the rotation direction of the rolling member 130a is changeable. Thereby, the frictional force generated by the first cleaning module 120 may be combined with one of the forward movement frictional force and the rearward movement frictional force by the rolling member 130a, which enables more various operations of the cleaner 100. Specifically, the highest speed of the cleaner 100 in the longitudinal direction may be further increased, the radius of rotation of the cleaner 100 made upon rightward or leftward rotation may be changed in various ways, the cleaner 100 may rotate rightward or leftward while moving rearward, and the cleaner may perform mopping via rotation thereof in the state in which the body 110 remains in place.

When the first cleaning module 120 performs predetermined rotation (to generate forward movement frictional force, rearward movement frictional force, leftward moment frictional force, or rightward moment frictional force), the rolling member 130a may perform two or more different types of rotation. When the first cleaning module 120 performs predetermined rotation, the rolling member 130a may be controlled so as to rotate in the third forward direction w3f. When the first cleaning module 120 performs predetermined rotation, the rolling member 130a may be controlled so as to rotate in the third reverse direction w3r. When the first cleaning module 120 performs predetermined rotation, the rolling member 130a may be controlled so as to remain stationary without rotation. When the first cleaning module 120 performs predetermined rotation, the rolling member 130a may be controlled so as to rotate in the third forward direction w3f at a selected one of two or more preset RPMs. When the first cleaning module 120 performs predetermined rotation, the rolling member 130a may be controlled so as to rotate in the third reverse direction w3r at a selected one of two or more preset RPMs. In this way, various driving routes and driving speeds of the cleaner 100 may be realized.

The section in which the rolling member 130a is in contact with the floor may be elongated in the transverse direction. The right end of the left spin mop 120a and the left end of the right spin mop 120b may be spaced apart from each other by a predetermined distance. When viewed from the front side, the section in which the rolling member 130a is in contact with the floor may overlap the entire gap between the left spin mop 120a and the right spin mop 120b. The gap between the left spin mop 120a and the right spin mop 120b is not mopped well by the first cleaning module 120. When the cleaner 100 moves in the longitudinal direction, the rolling member 130a mops the floor surface corresponding to the gap, thereby complementing the mopping of the first cleaning module 120.

The section in which the rolling member 130a is in contact with the floor may be elongated in the transverse direction. When viewed from the front side, the section in which the rolling member 130a is in contact with the floor may overlap the entire section that interconnects the rotational center Osa of the left spin mop 120a and the rotational center Osb of the right spin mop 120b. The portion of the left spin mop 120a at the right side of the rotational center Osa and the portion of the right spin mop 120b at the left side of the rotational center Osb are portions in which relatively low frictional force is generated, and may not perform mopping well compared to the portion of the left spin mop 120a at the left side of the rotational center Osa and the portion of the right spin mop 120b at the right side of the rotational center Osb. When the cleaner 100 moves in the longitudinal direction, the rolling member 130a mops the section that interconnects the rotational center Osa of the left spin mop 120a and the rotational center Osb of the right spin mop 120b, thereby complementing the mopping of the first cleaning module 120.

Referring to FIGS. 20 to 23, the first cleaning module 120 includes the rotating plate 122, which is rotatably provided at the lower side of the body 110. The rotating plate 122 may be formed by a circular plate member. The mop unit 121 is fixed to the lower surface of the rotating plate 122. The spin shaft 128 is fixed to the center portion of the rotating plate 122.

The first cleaning module 120 includes a left rotating plate 122, which fixes the mop unit 121 of the left spin mop 120a, and a right rotating plate 122, which fixes the mop unit 121 of the right spin mop 120b.

The rotating plate 122 includes a mop fixing piece 122c, which fixes the mop unit 121. The mop unit 121 may be separably fixed to the mop fixing piece 122c. The mop fixing piece 122c may be a Velcro tape or the like disposed at the lower side of the rotating plate 122. The mop fixing piece 122c may be a hook or the like disposed on the edge of the rotating plate 122.

The rotating plate 122 includes a slope 122d, which is disposed on the lower end of the spin shaft 128 so that the water inside a water supply space Sw moves downward along the slope 122d by the weight thereof. The slope 122d is formed along the periphery of the lower end of the spin shaft 128. The slope 122d is downwardly inclined in the centrifugal direction XO. The entire slope 122d may be formed in a truncated cone shape. The lower end of the spin shaft 128 is fixed to the upper center of the slope 122d.

A water supply hole 122a vertically penetrates the rotating plate 122. The water supply hole 122a connects the water supply space Sw to the lower side of the rotating plate 122. The water inside the water supply space Sw moves to the lower side of the rotating plate 122 through the water supply hole 122a. The water inside the water supply space Sw moves to the mop unit 121 through the water supply hole 122a. The water supply hole 122a is located in the center portion of the rotating plate 122. The water supply hole 122a is located so as to avoid the spin shaft 128.

The rotating plate 122 may be provided with a plurality of water supply holes 122a. A connecting portion 122b is disposed between the respective water supply holes 122a. The connecting portion 122b interconnects the portion of the rotating plate 122 in the centrifugal direction XO and the portion of the rotating plate 122 in the counter-centrifugal direction XI on the basis of the water supply hole 122a.

The plurality of water supply holes 122a may be spaced apart from each other in the peripheral direction of the spin shaft 128. The water supply holes 122a may be spaced apart from each other by a constant distance. Thereby, when the rotating plate 122 rotates, the water may be equally supplied in all directions about the spin shaft 128.

The water supply holes 122a are disposed in the centrifugal direction XO in the lower end portion of the slope 122d. Thereby, the water moving downward along the slope 122d by gravity and the centrifugal force may be introduced into the water supply holes 122a. The side surface of each water supply hole 122a in the counter-centrifugal direction XI may be aligned with the lower end portion of the slope 122d.

The side surface Qh of the water supply hole 122a in the centrifugal direction XO and the side surface Qw of the water supply reservoir 123 in the counter-centrifugal direction XI are provided so as to vertically extend. The side surface Qh of the water supply hole 122a in the centrifugal direction XO and the side surface Qw of the water supply reservoir 123 in the counter-centrifugal direction XI are disposed on substantially the same vertical line. Thereby, the water, which tends to move in the centrifugal direction XO by the centrifugal force, may be finally introduced into the water supply hole 122a.

The side surface Qh of the water supply hole 122a in the centrifugal direction XO forms a cylindrically curved surface. The side surface Qw of the water supply reservoir 123 in the counter-centrifugal direction XI forms a cylindrically curved surface. Both the side surface Qh of the water supply hole 122a in the centrifugal direction XO and the side surface Qw of the water supply reservoir 123 in the counter-centrifugal direction XI form a cylindrically curved surface.

The first cleaning module 120 includes the mop unit 121, which is coupled to the lower side of the rotating plate 122 so as to be brought into contact with the floor. The mop unit 121 is disposed on each of the lower surface of the left spin mop 120a and the lower surface of the right spin mop 120b. The mop unit 121 may be fixedly disposed on the rotating plate 122, or may be disposed in a manner such that it is replaceable. The mop unit 121 may be separably fixed to the rotating plate 122 via a Velcro tape, a hook, or the like. The mop unit 121 may be configured by only a mop, or may include a mop and a spacer (not illustrated). The mop serves to perform mopping in contact with the floor. The spacer may be disposed between the rotating plate 122 and the mop and may serve to adjust the position of the mop. The spacer may be separably fixed to the rotating plate 122, and the mop may be separably fixed to the spacer. Needless to say, the mop 121a may be separably fixed to the rotating plate 122 without the spacer.

Referring to FIGS. 8 and 10 and FIGS. 18 to 23, the first cleaning module 120 includes the spin shaft 128 configured to rotate the rotating plate 122. The spin shaft 128 is fixed to the rotating plate 122 and transmits the torque of the spin-drive unit 124 to the rotating plate 122. The spin shaft 128 is connected to the upper side of the rotating plate 122. The spin shaft 128 is disposed on the upper center of the rotating plate 122. The spin shaft 128 is fixed to the rotation center Osa or Osb of the rotating plate 122. The spin shaft 128 includes a gear fixing portion 128a for fixing a gear 127b. The gear fixing portion 128a is disposed on the upper end of the spin shaft 128.

The first cleaning module 120 includes a left spin shaft 128 fixed to the left rotating plate 122 to rotate the left rotating plate 122, and a right spin shaft 128 fixed to the right rotating plate 122 to rotate the right rotating plate 122.

The spin shaft 128 extends perpendicular to the rotating plate 122. The left spin shaft 128 is disposed perpendicular to the lower surface of the left spin mop 120a, and the right spin shaft 128 is disposed perpendicular to the lower surface of the right spin mop 120b. In an embodiment in which the lower surface of the spin mop 120a or 120b is inclined relative to the horizontal plane, the spin shaft 128 is tilted relative to the vertical axis. The upper end of the spin shaft 128 is tilted to one side relative to the lower end. The upper end of the left spin shaft 128 is tilted leftward relative to the lower end. The upper end of the right spin shaft 128 is tilted rightward relative to the lower end.

The tilting angle of the spin shaft 128 relative to the vertical axis may be changed depending on the rotation of the tilting frame 125 about the tilting rotating shaft 126. The spin shaft 128 is rotatably coupled to the tilting frame 125 so as to be integrally tilted with the tilting frame 125. When the tilting frame 125 is tilted, the spin-drive unit 124, the driving transmission unit 127, the spin shaft 128, the rotating plate 122, the water supply reservoir 123, and the mop unit 121 are integrally tilted along with the tilting frame 125.

The first cleaning module 120 includes the water supply reservoir 123, which is disposed at the upper side of the rotating plate 122 so as to accommodate therein water. The water supply reservoir 123 defines the water supply space Sw in which water is accommodated. The water supply reservoir 123 surrounds the periphery of the spin shaft 128 and is spaced apart from the spin shaft 128 so as to define the water supply space Sw therebetween. The water supply reservoir 123 allows the water supplied to the upper side of the rotating plate 122 to be collected in the water supply space Sw until the water passes through the water supply hole 122a. The water supply space Sw is disposed at the upper side of the center portion of the rotating plate 122. The entire water supply space Sw has a cylindrical volume. The upper side of the water supply space Sw is open so that the water is introduced into the water supply space Sw through the upper side of the water supply space Sw.

The water supply reservoir 123 protrudes upward from the rotating plate 122. The water supply reservoir 123 extends in the peripheral direction of the spin shaft 128. The water supply reservoir 123 may take the form of a ring-shaped rib. The water supply hole 122a is located in the inner lower surface of the water supply reservoir 123. The water supply reservoir 123 is spaced apart from the spin shaft 128.

The surface Qw of the water supply reservoir 123 in the counter-centrifugal direction XI faces the outer peripheral surface of the spin shaft 128. The side surface Qw is spaced apart from the spin shaft 128. The side surface Qw is vertically smoothly connected to the side surface Qh. The lower end of the water supply reservoir 123 is fixed to the rotating plate 122. The water supply reservoir 123 has a free upper end.

The first cleaning module 120 includes the spin-drive unit 124, which provides drive force for the rotation of the spin mop 120a or 120b. The first cleaning module 120 includes a left spin-drive unit 124, which provides power required for rotating the left spin shaft 128, and a right spin-drive unit 124, which provides power required for rotating the right spin shaft 128. The left spin-drive unit 124 provides drive force required for rotating the left spin shaft 128. The right spin-drive unit 124 provides drive force required for rotating the right spin shaft 128.

The first cleaning module 120 includes the driving transmission unit 127, which transmits the torque of the spin-drive unit 124 to the spin shaft 128. The driving transmission unit 127 may include a plurality of gears and/or a belt, for example.

In the present embodiment, the driving transmission unit 127 includes a first gear 127a fixed to a rotating shaft of the motor 124. The first gear 127a may be a worm gear. The driving transmission unit 127 may include a second gear 127b, which is engaged and rotated with the first gear 127a. The second gear 127b may be a spur gear. The second gear 127b is fixed to the spin shaft 128 so as to allow the spin shaft 128 to be rotated simultaneously with the rotation of the second gear 127b.

The first cleaning module 120 includes the tilting frame 125, which is disposed on the body 110 so as to be tiltable within a predetermined angular range. The tilting frame 125 allows the inclination angles Ag1 and Ag2 to be changed depending on the state of the floor. The tilting frame 125 may perform a suspension function (of supporting the weight and alleviating vertical vibration) for the spin mop 120a or 120b. The tilting frame 125 is tiltably supported by the base 13. The tilting frame 125 rotatably supports the spin shaft 128.

The first cleaning module 120 includes the left tilting frame 125, which supports the left spin shaft 128. The left tilting frame 125 is rotatable within a predetermined range about a left tilting rotating shaft 126.

The first cleaning module 120 includes the right tilting frame 125, which supports the right spin shaft 128. The right tilting frame 125 is rotatable within a predetermined range about a right tilting rotating shaft 126.

For example, when the left spin mop 120a is brought into contact with a recessed portion in the floor, the inclination angle Ag1 of the left spin mop 120a may be increased within a predetermined range by the left tilting frame 125. When the right spin mop 120b is brought into contact with a recessed portion in the floor, the inclination angle Ag2 of the right spin mop 120b may be increased within a predetermined range by the right tilting frame 125.

The tilting frame 125 includes a frame base 125a defining the lower surface thereof. The spin shaft 128 is disposed so as to vertically penetrate the frame base 125a. The frame base 125a may be configured by a plate, which forms a vertical thickness. The tilting rotating shaft 126 rotatably interconnects the base 13 and the frame base 125a.

The cleaner 100 includes a water supply cabinet 125b disposed at the upper side of the water supply reservoir 123. The tilting frame 125 may include the water supply cabinet 125b.

The water supply cabinet 125b may accommodate therein the spin shaft 128. The water supply cabinet 125b may be disposed at the lower side of the body 110. The water supply cabinet 125b may cover the upper side of the water supply reservoir 123. When viewed from the upper side, the water supply cabinet 125b may cover the upper side of the water supply reservoir 123. The water supply cabinet 125b may define the space recessed upward from the lower surface of the body 110 so as to accommodate the upper end portion of the water supply reservoir 123. The water supply cabinet 125b is fixed to the frame base 125a. The water supply cabinet 125b defines the space recessed upward from the lower surface of the frame base 125a. The water is introduced into the space defined by the water supply cabinet 125b through a water feeder 125c. The water supply cabinet 125b may minimize scattering of the water, thereby guiding the water to be wholly introduced into the water supply reservoir 123.

The water supply cabinet 125b includes a rotating-shaft support portion 125b1, which rotatably supports the spin shaft 128. A bearing B may be provided between the rotating-shaft support portion 125b1 and the spin shaft 128. The bearing B may include a first bearing B1 disposed at the lower side, and a second bearing B2 disposed at the upper side.

The lower end portion of the rotating-shaft support portion 125b1 is inserted into the water supply space Sw of the water supply reservoir 123. The inner peripheral surface of the rotating-shaft support portion 125b1 supports the spin shaft 128. The outer peripheral surface of the rotating-shaft support portion 125b1 faces the inner peripheral surface Qw of the water supply reservoir 123. Thereby, it is possible to stably support the spin shaft 128 and to easily guide the water to be collected in the water supply space Sw.

The lower end portion of the rotating-shaft support portion 125b1 is disposed between the spin shaft 128 and the inner peripheral surface Qw of the water supply reservoir 123. The outer peripheral surface of the lower end portion of the rotating-shaft support portion 125b1 is spaced apart from the inner peripheral surface Qw of the water supply reservoir 123 so as to define the water supply space Sw therebetween. The slope 122d is disposed on the lower end portion of the rotating-shaft support portion 125b1.

The water supply cabinet 125b includes partitions 125b2 and 125b3, which protrude from the rotating-shaft support portion 125b1. The partitions 125b2 and 125b3 cover the upper end portion of the water supply reservoir 123. The partitions 125b2 and 125b3 cover the upper end and the outer peripheral surface of the water supply reservoir 123. The partitions 125b2 and 125b3 are disposed in the centrifugal direction XO of the rotating-shaft support portion 125b1. The partitions 125b2 and 125b3 are fixed to and supported by the frame base 125a. The partitions 125b2 and 125b3 support the rotating-shaft support portion 125b1.

The partitions 125b2 and 125b3 include a first partition 125b2, which covers the upper end of the water supply reservoir 123. The first partition 125b2 protrudes from the rotating-shaft support portion 125b1 in the centrifugal direction XO. The partitions 125b2 and 125b3 include a second partition 125b3, which covers the upper end portion of the outer peripheral surface of the water supply reservoir 123. The second partition 125b3 protrudes downward from the first partition 125b2. The second partition 125b3 has a free lower end.

The cleaner 100 includes the water feeder 125c, which guides the water inside the body 110 so as to be introduced into the water supply reservoir 123. The tilting frame 125 includes the water feeder 125c, which receives the water from the water supply module 150.

The water feeder 125c receives the water supplied from a supply pipe 156. The water feeder 125c forms a water flow path. The water feeder 125c guides the water to pass through the water supply cabinet 125b and be introduced into the water supply reservoir 123. One end of the flow path formed by the water feeder 125c is connected to the end of the water supply pipe 156. The other end of the flow path formed by the water feeder 125c is disposed in the water supply space Sw. One end of the flow path formed by the water feeder 125c is disposed outside the water supply cabinet 125b (inside the body 110), and the other end is disposed inside the water supply cabinet 125b (in the portion in which the water supply space Sw is disposed). The water feeder 125c is fixed to the tilting frame 125. The water feeder 125c is fixed to the water supply cabinet 125b.

The tilting frame 125 includes the first support portion 125d, which supports one end of the elastic member 129. The other end of the elastic member 129 is supported by the second support portion 13b disposed on the base 13. The second support portion 13b may be formed on the support member 13a of the base 13. When the tilting frame 125 is tilted about the tilting rotating shaft 126, the position of the first support portion 125d is changed and the length of the elastic member 129 is changed.

The first support portion 125d is fixed to the tilting frame 125. The first support portion 125d is disposed on the right portion of the left tilting frame 125. The first support portion 125d is disposed on the left portion of the right tilting frame 125.

The second support portion 13b is fixed to the base 13. The second support portion 13b is disposed in the right area of the left spin-mop module 120. The second support portion 13b is disposed in the left area of the right spin-mop module 120.

The first support portion 125d is fixed to the tilting frame 125. When the tilting frame 125 is tilted, the first support portion 125d is also tilted along with the tilting frame 125. The first support portion 125d protrudes away from the titling shaft 126 so that the portion thereof to which one end portion of the elastic member 129 is fixed is spaced apart from the tilting rotating shaft 126 by a predetermined distance. When the inclination angles Ag1 and Ag2 reach the minimum values, the distance between the first support portion 125d and the second support portion 13b becomes the longest, and when the inclination angles Ag1 and Ag2 reach the maximum values, the distance between the first support portion 125d and the second support portion 13b becomes the shortest. The elastic member 129 is elastically deformed and tensioned in the state in which the inclination angles Ag1 and Ag2 reach the minimum values.

Figure 8:
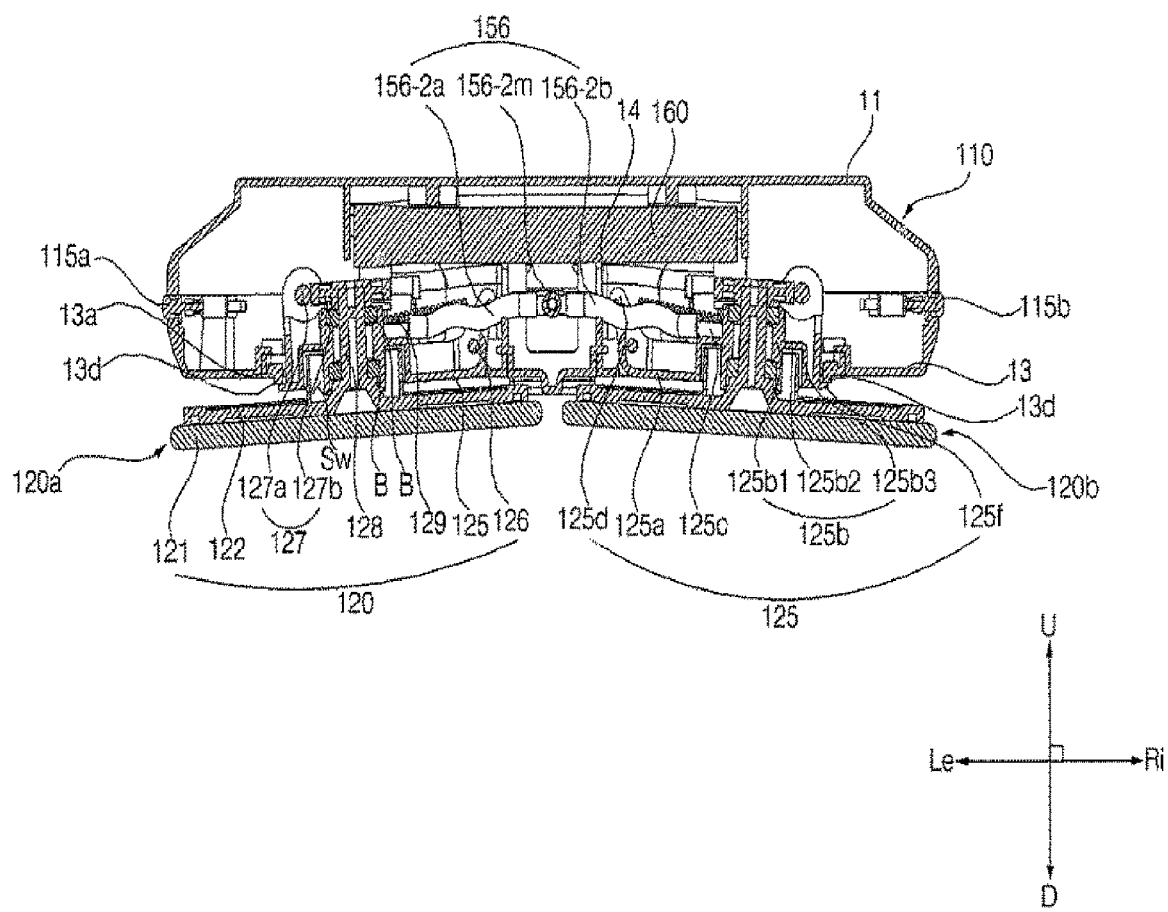
FIG. 8 is a vertical cross-sectional view of the cleaner 100 taken along line S1-S1' of FIG. 6.
Figure 9:
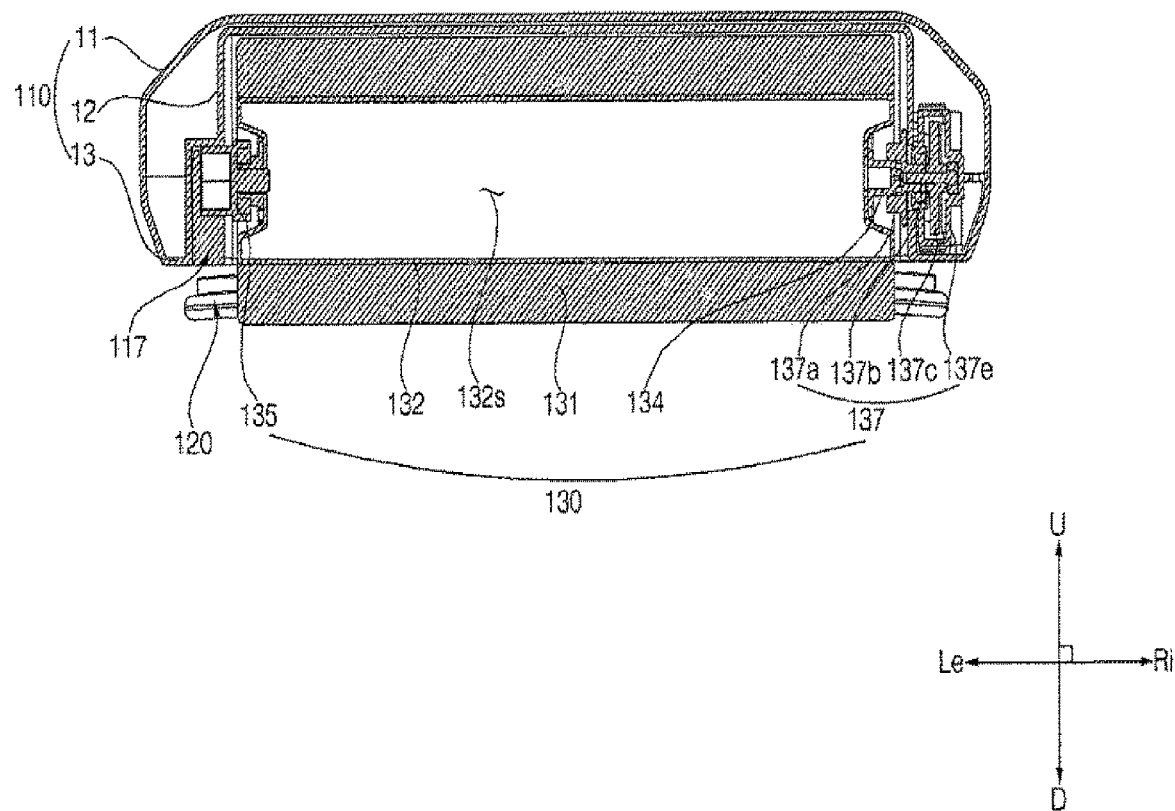
FIG. 9 is a vertical cross-sectional view of the cleaner 100 taken along line S2-S2' of FIG. 6.

Referring to FIG. 8, when the left tilting frame 125 rotates in the counterclockwise direction about the tilting rotating shaft 126 when viewed from the rear side, the second support portion 13b moves leftward and the elastic member 129 is shortened and elastically restored. When the left tilting frame 125 rotates in the clockwise direction about the tilting rotating shaft 126 when viewed from the rear side, the second support portion 13b moves rightward and the elastic member 129 is lengthened and elastically deformed. When the right tilting frame 125 rotates in the clockwise direction about the tilting rotating shaft 126 when viewed from the rear side, the second support portion 13b moves rightward and the elastic member 129 is shortened and elastically restored. When the right tilting frame 125 rotates in the counterclockwise direction about the tilting rotating shaft 126 when viewed from the rear side, the second support portion 13b moves leftward and the elastic member 129 is lengthened and elastically deformed.

The tilting frame 125 includes a motor support portion 125e, which supports the spin-drive unit 124. The motor support portion 125e may support the driving transmission unit 127.

The tilting frame 125 includes the upper-end-limit contact portion 125f configured so as to be brought into contact with the upper-end limit 13d. The upper surface of the upper-end-limit contact portion 125f may be brought into contact with the lower surface of the upper-end limit 13d. A left upper-end-limit contact portion 125f may be disposed on the left end of the left tilting frame 125. A right upper-end-limit contact portion 125f may be disposed on the right end of the right tilting frame 125.

The first cleaning module 120 includes the tilting rotating shaft 126, which is a rotating shaft of the tilting frame 125. The tilting rotating shaft 126 extends in the direction perpendicular to the inclined direction of the spin mop 120a or 120b. The tilting rotating shaft 126 may extend in the horizontal direction. In the present embodiment, the tilting rotating shaft 126 extends in the longitudinal direction.

The first cleaning module 120 includes the left tilting rotating shaft 126, which extends in the direction perpendicular to the inclined direction of the lower surface of the left spin mop 120a. The first cleaning module 120 includes the right tilting rotating shaft 126, which extends in the direction perpendicular to the inclined direction of the lower surface of the right spin mop 120b.

The first cleaning module 120 includes the elastic member 129, which applies elastic force to the tilting frame 125. The elastic member 129 stretches when the tilting frame 125 is rotated downward, and shrinks when the tilting frame 125 is rotated upward. The elastic member 129 enables shock-absorbing (elastic) operation of the tilting frame 125. The elastic member 129 applies a moment to the tilting frame 125 so that the inclination angle Ag1 or Ag2 is increased. The entire elastic member 129 may be elongated in the transverse direction.

Figure 12:
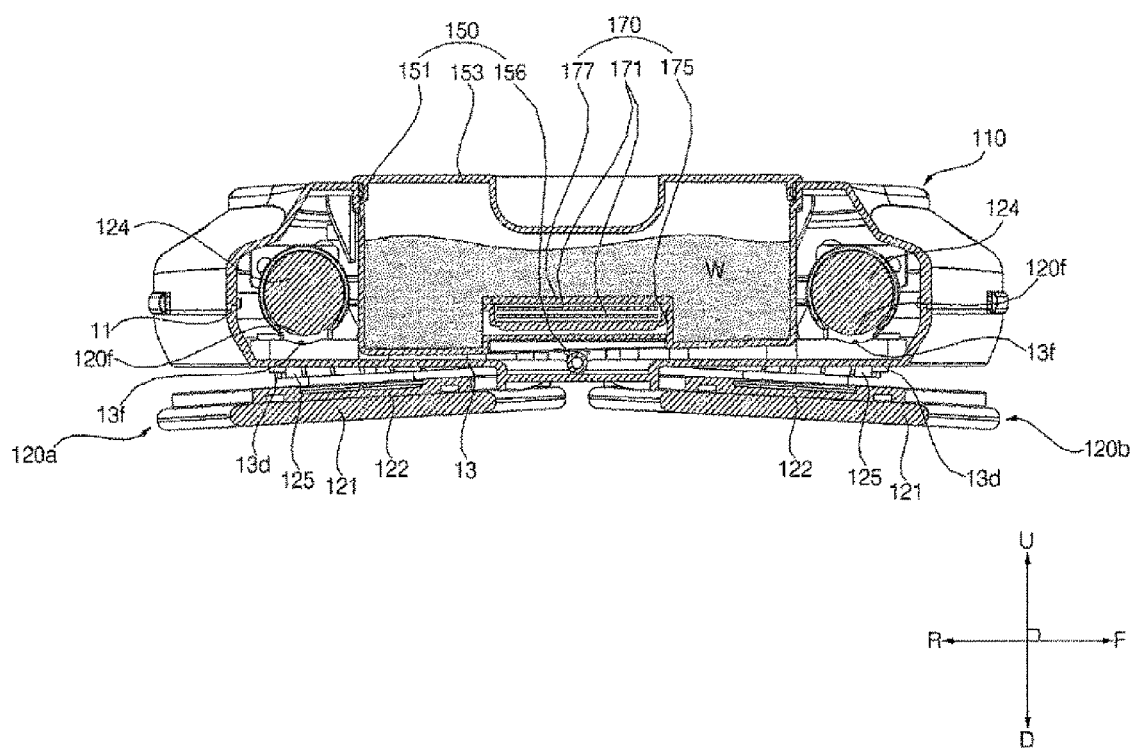
FIG. 12 is a vertical cross-sectional view of the cleaner 100 taken along line S5-S5' of FIG. 7.
Figure 13:
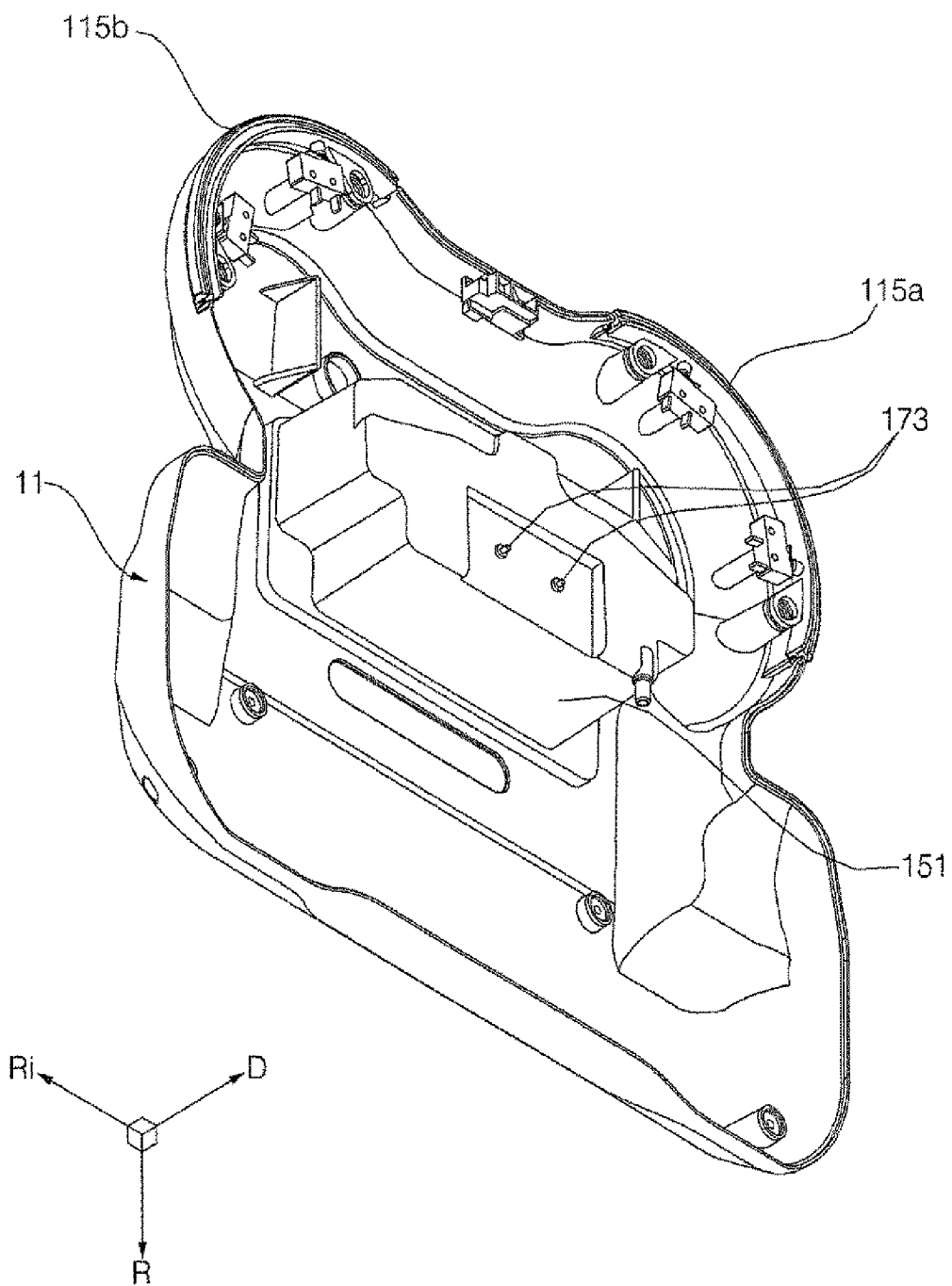
FIG. 13 is a perspective view illustrating the inner surface of a case 11 of the cleaner 100 of FIG. 1.
Figure 14:
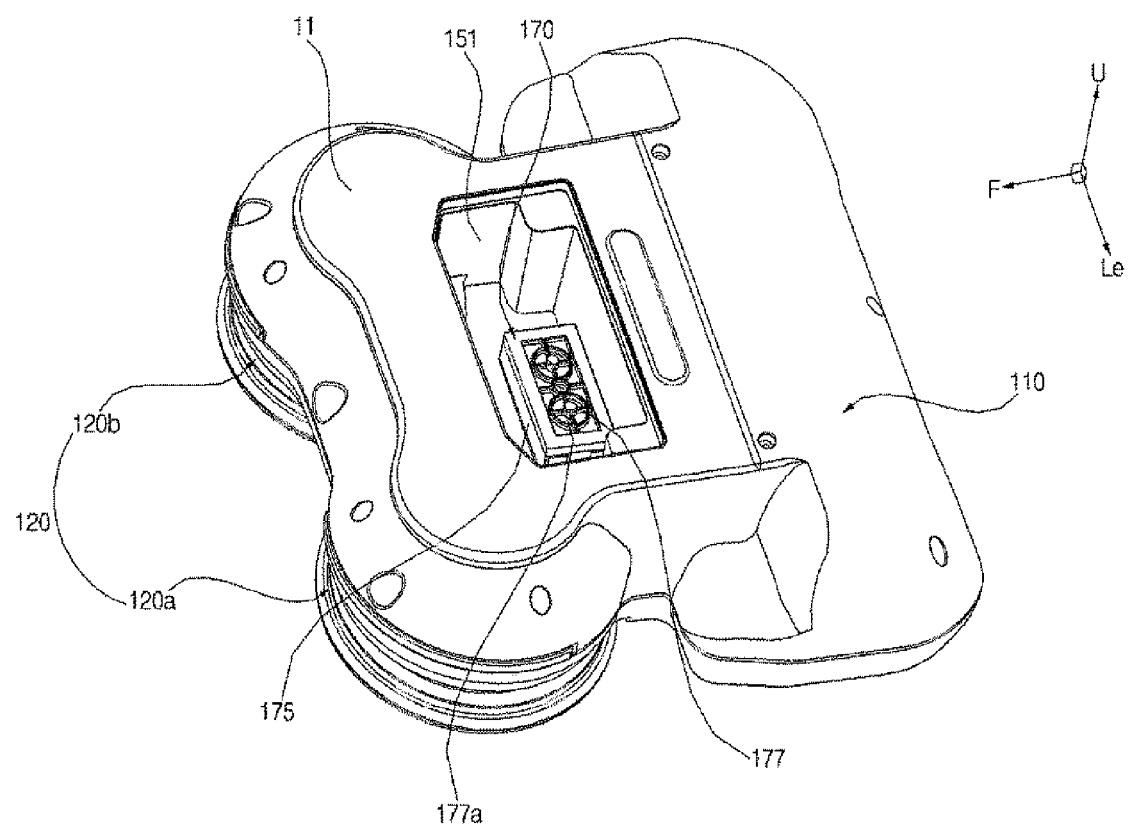
FIG. 14 is a perspective view illustrating the state in which a water-tank opening/closing member 153 is removed from the cleaner 100 of FIG. 1.
Figure 15A:
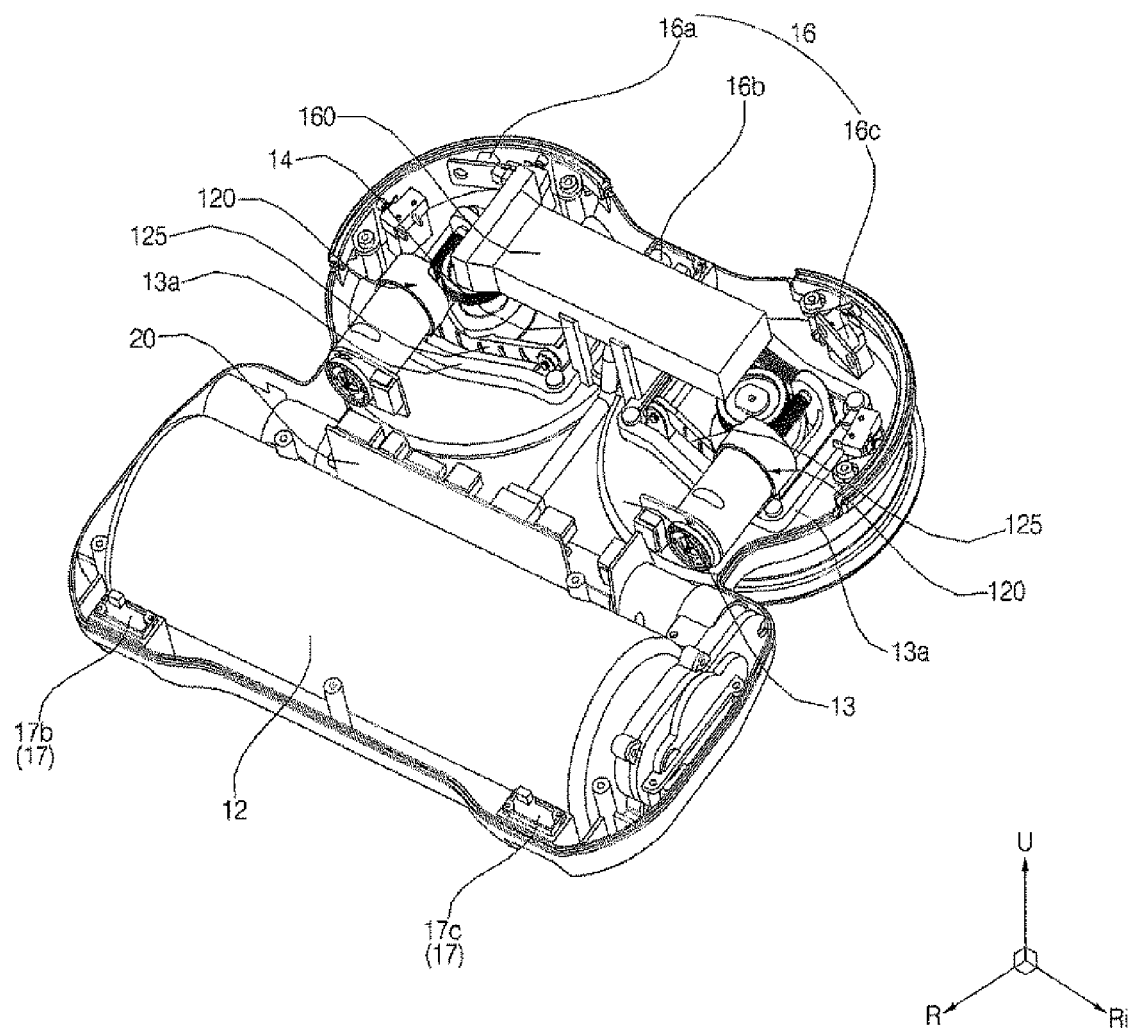
FIGS. 15A and 15B are perspective views illustrating the state in which the case 11 is removed from the cleaner 100 of FIG. 1.
Figure 15B:
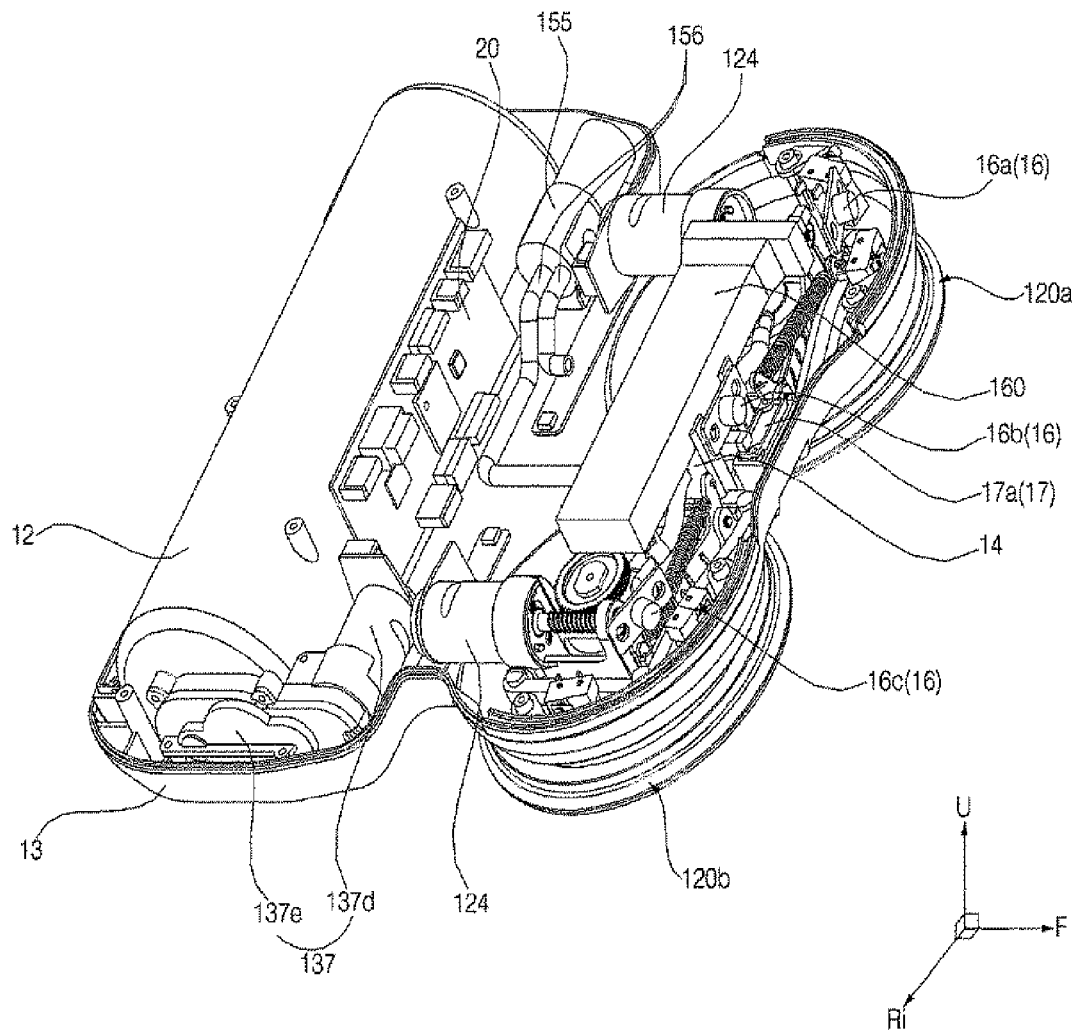
Figure 16A:
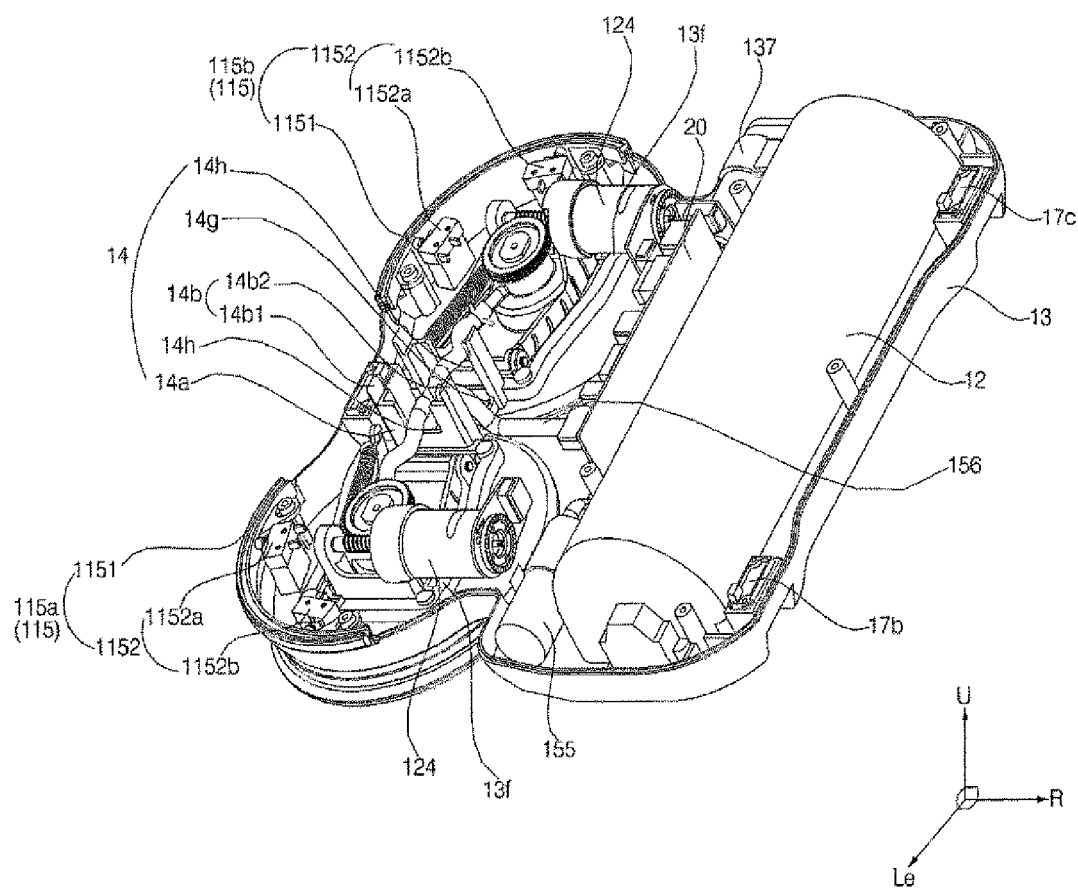
FIGS. 16A and 16B are perspective views illustrating the state in which a battery 160 is removed from the cleaner 100 of FIGS. 15A and 15B.
Figure 16B:
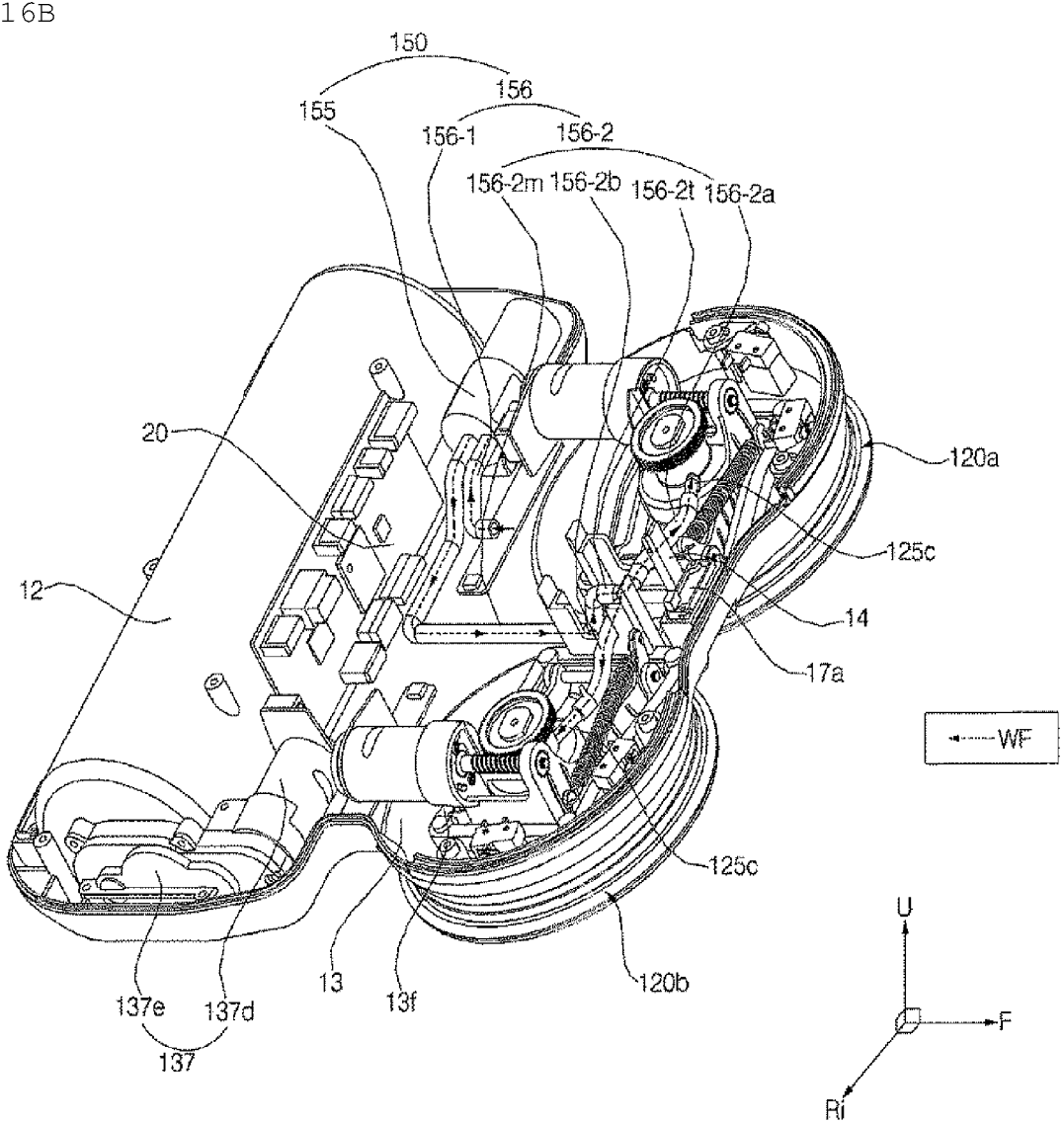

Referring to FIGS. 12, 16A and 16B, the first cleaning module 120 includes the lower-end-limit contact portion 120f configured to be brought into contact with the lower-end limit 13f. The lower surface of the lower-end-limit contact portion 120f may be brought into contact with the upper surface of the lower-end limit 13f. The lower-end-limit contact portion 120f may be disposed on the lower portion of the spin-drive unit 124. The spin-drive unit 124 may be disposed so as to protrude horizontally from the tilting frame 125. The lower-end-limit contact portion 120f is disposed on the lower portion of the protruding portion of the spin-drive unit 124.

Referring to FIGS. 11 and 16A to 18, the water supply module 150 supplies water to the first cleaning module 120. In the drawings, the water W filling the water tank 151 and the water flow direction WF are illustrated. The water supply module 150 supplies water to the water supply space Sw.

The water supply module 150 includes the water tank 151, which stores therein water. The water tank 151 is disposed inside the body 110. The water tank 151 is disposed at the upper side of the spin mops 120a and 120b.

In the present embodiment, the water supply module 150 includes the pump 155 for applying pressure to the water W inside the water tank 151. The pump 155 may apply pressure to the water in order to move the water to the first cleaning module 120. The pump 155 may apply pressure to the water W so as to supply the water W from the water tank 151 to the water supply space Sw.

Although not illustrated, in another embodiment, the water supply module may include a valve, and when the valve is opened, the water inside the water tank may move to the first cleaning module by the weight thereof without the pump.

Although not illustrated, in a further embodiment, the water supply module may include a water permeable cap. The water permeable cap may be disposed in the supply pipe so that the water moves through the water permeable cap. The water permeable cap may be configured to reduce the flow rate of the water.

Hereinafter, a description will be made based on the present embodiment including the pump 155, but the invention is not necessarily limited thereto.

The water supply module 150 includes the supply pipe 156, which guides the movement of the water W from the water tank 151 to the first cleaning module 120. The water supply pipe 156 interconnects the water tank 151 and the water feeder 125c to guide the movement of the water. The supply pipe 156 may flexibly bend according to the tilting of the tilting frame 125.

The supply pipe 156 includes a first supply pipe 156-1, which guides movement of the water W from the water tank 151 to the pump 155, and a second supply pipe 156-2, which guides movement of the water W from the pump 155 to the first cleaning module 120. One end of the first supply pipe 156-1 is connected to the lower portion of the water tank 151, and the other end is connected to the pump 155. One end of the second supply pipe 156-2 is connected to the pump 155, and the other end is connected to the water feeder 125c.

The second supply pipe 156-2 includes a common pipe 156-2m, which guides movement of the water at a relatively upstream side. One end of the common pipe 156-2m is connected to the pump 155, and the other end is connected to a three-way connector 156-2t.

The second supply pipe 156-2 includes a first branch pipe 156-2a for guiding movement of the water W to the left spin-mop module 120, and a second branch pipe 156-2b for guiding movement of the water W to the right spin-mop module 120. The first branch pipe 156-2a guides some of the water inside the common pipe 156-2m to the left spin-mop module 120. The second branch pipe 156-2b guides the remaining water inside the common pipe 156-2m to the right spin-mop module 120. One end of the first branch pipe 156-2a is connected to the three-way connector 156-2t, and the other end is connected to the water feeder 125c of the left spin-mop module 120. One end of the second branch pipe 156-2b is connected to the three-way connector 156-2t and the other end is connected to the water feeder 125c of the right spin-mop module 120.

The second supply pipe 156-2 includes the three-way connector 156-2t, which connects the common pipe 156-2m, the first branch pipe 156-2a, and the second branch pipe 156-2b with each other. The three-way connector 156-2t forms a T-shaped flow path overall. The three-way connector 156-2t includes a flow path portion, which extends in the longitudinal direction and is connected to the common pipe 156-2m. The three-way connector 156-2t includes two branch flow-path portions, which extend respectively in two directions from the flow-path portion connected to the common pipe 156-2m. The two branch flow-path portions are respectively connected to the first branch pipe 156-2a and the second branch pipe 156-2b.

Figure 17:
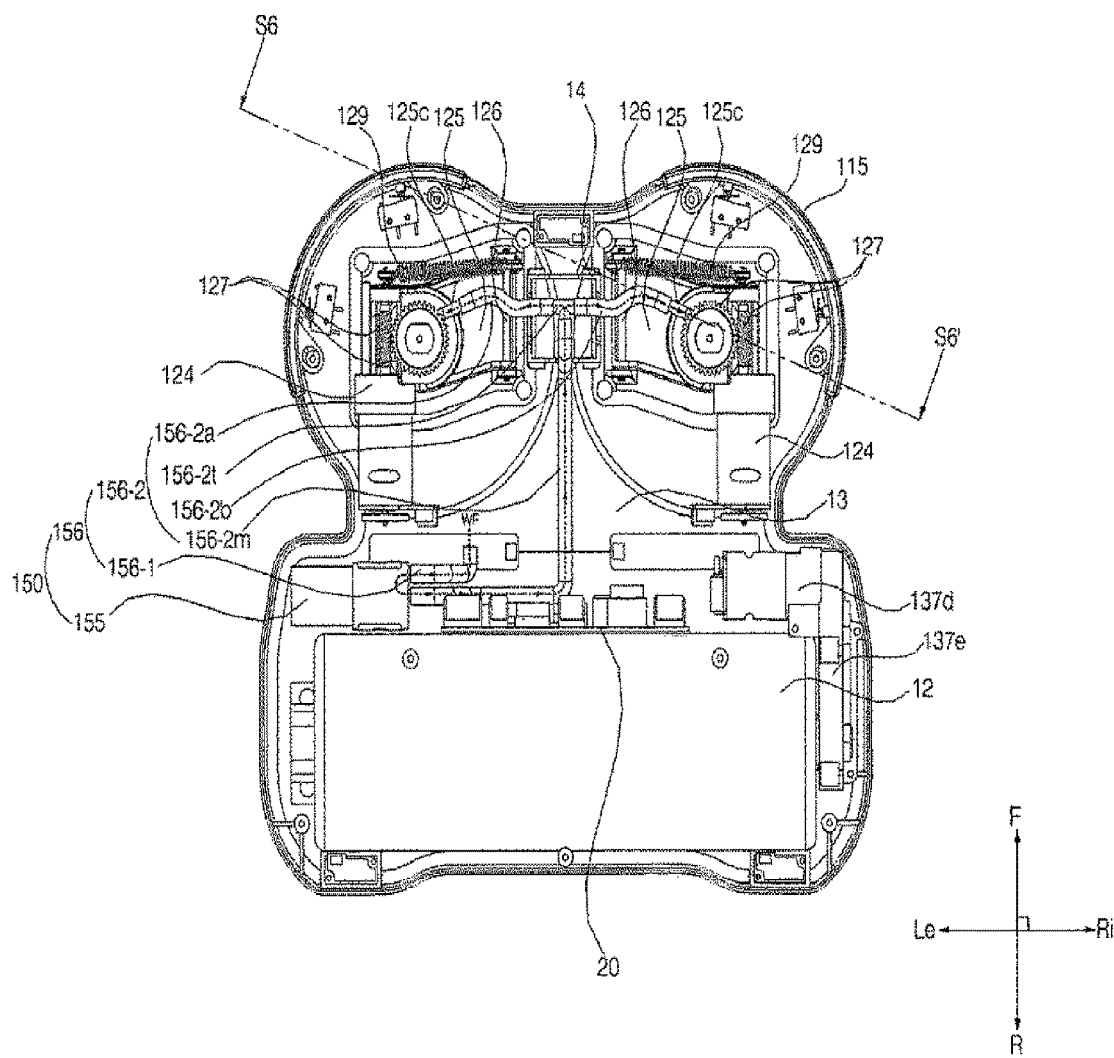
FIG. 17 is a top view of the cleaner 100 of FIGS. 16A and 16B.
Figure 18:
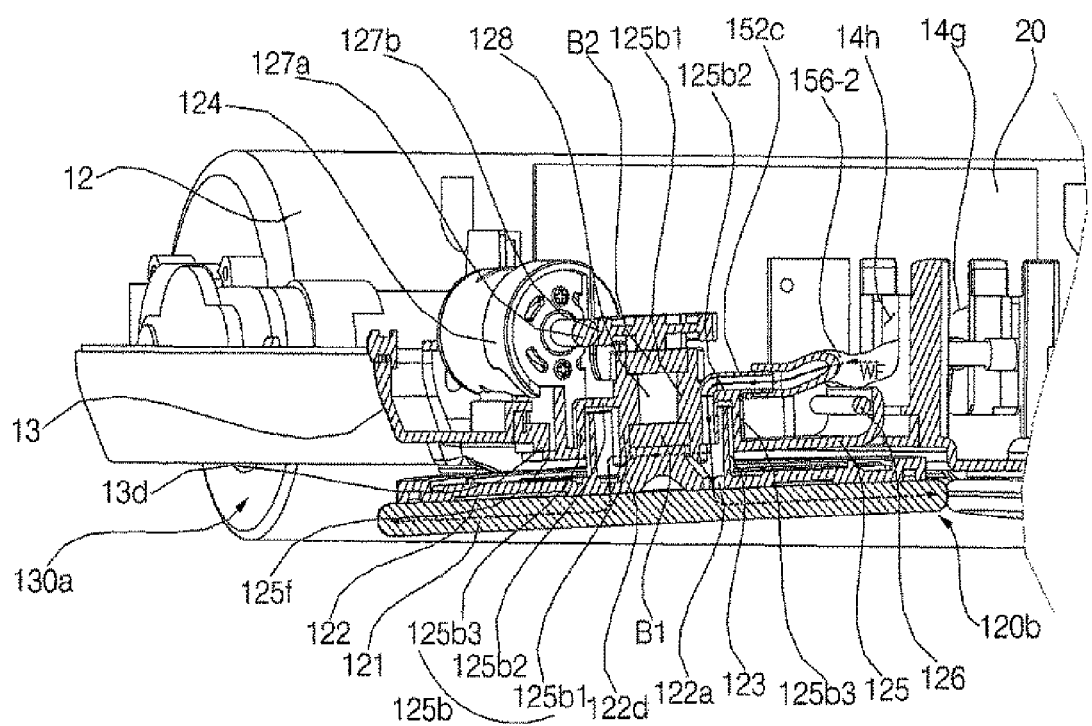
FIG. 18 is a vertical cross-sectional view of the cleaner 100 taken along line S6-S6' of FIG. 17.
Figure 19:
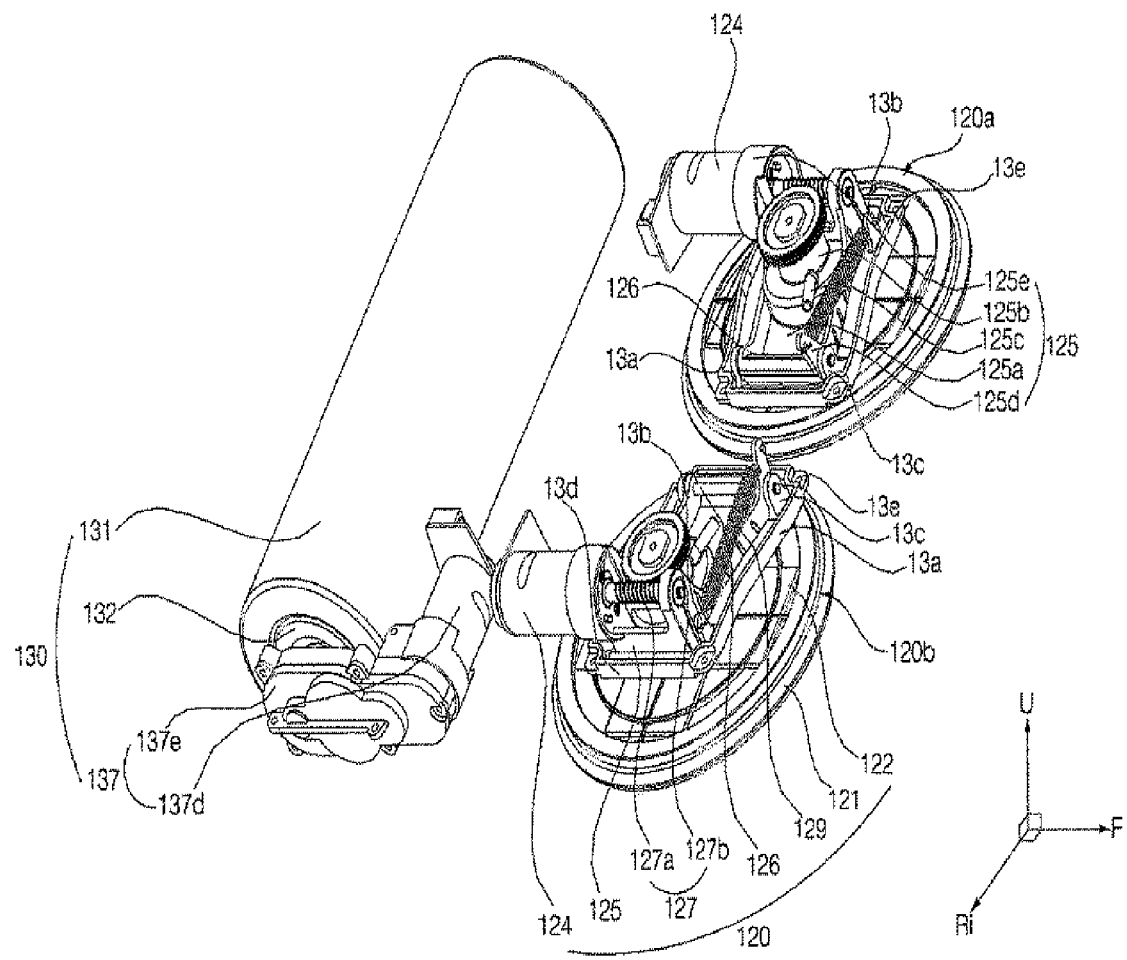
FIG. 19 is a perspective view illustrating only a first cleaning module 120 and a second cleaning module 130 in the cleaner 100 of FIG. 1.
Figure 20:
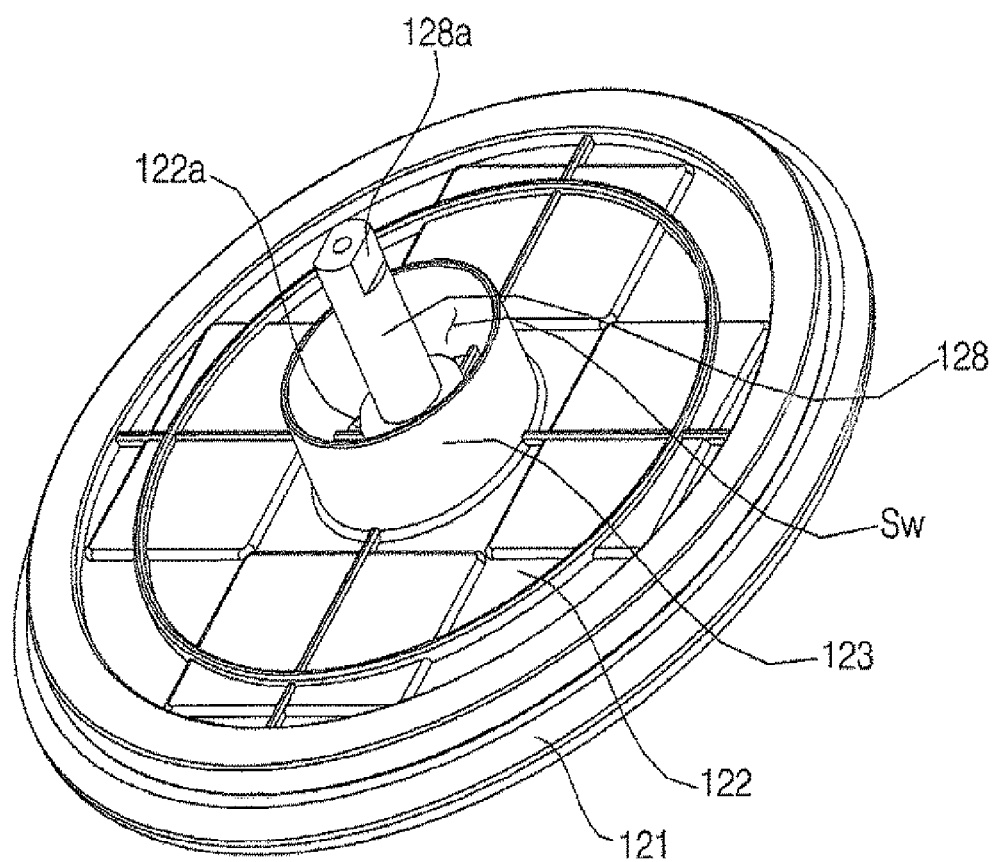
FIG. 20 is a perspective view illustrating spin mops 120a and 120b of FIG. 19.
Figure 21:
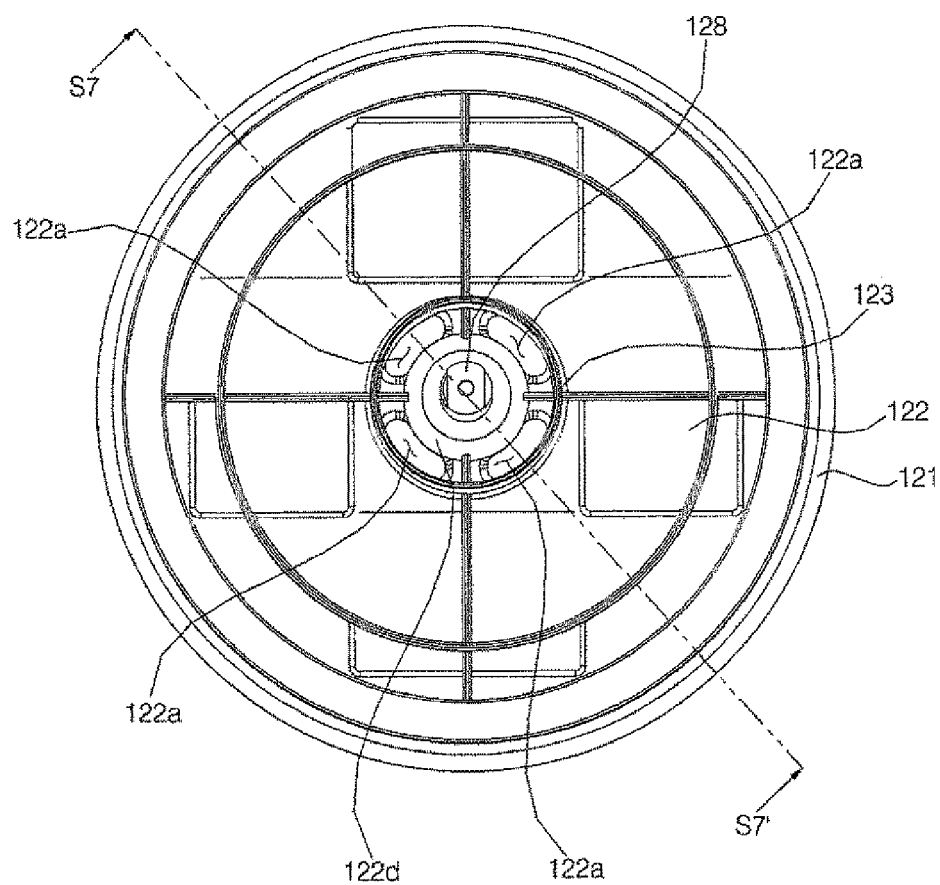
FIG. 21 is a top view illustrating the spin mops 120a and 120b of FIG. 20.

A description related to the water flow direction WF will be made below with reference to FIGS. 11, 17 and 18. The pump 155 may be driven to cause movement of the water W. The water W inside the water tank 151 is introduced into the water feeder 125c through the water supply pipe 156. The water W inside the water tank 151 sequentially passes through the first supply pipe 156-1 and the second supply pipe 156-2. The water W inside the water tank 151 sequentially passes through the common pipe 156-2m and the first branch pipe and is introduced into the water feeder 125c of the left spin-mop module 120. The water W inside the water tank 151 sequentially passes through the common pipe 156-2m and the second branch pipe and is introduced into the water feeder 125c of the right spin-mop module 120. The water introduced into the water feeder 125c passes through the tilting frame 125 and is introduced into the water supply reservoir 123. The water introduced into the water supply reservoir 123 passes through the water supply hole 122a and is introduced into the center portion of the mop unit 121. The water introduced into the center portion of the mop unit 121 moves to the edge of the mop unit 121 by centrifugal force generated by rotation of the mop unit 121. The water remaining on the floor surface is mopped by the mop unit 131 of the second cleaning module 130, which follows the mop unit 121 at the rear side thereof.

Referring to FIGS. 15A to 18, the body 110 includes a battery support unit 14, which supports the battery 160. The battery support unit 14 supports the battery 160 so as to be disposed at the upper side of the supply pipe. The battery support unit 14 functions to guide the position of the supply pipe 156. The common pipe 156-2m, the first branch pipe 156-2a, and the second branch pipe 156-2b are components that accommodate therein water, which has a relatively high specific gravity. These components may be bilaterally symmetrically disposed to each other in order to ensure the equal distribution of weight to the left spin mop 120a and the right spin mop 120b. To this end, the battery support unit 14 guides the positions of the common pipe 156-2m, the first branch pipe 156-2a, and the second branch pipe 156-2b.

The battery support unit 14 includes a supporter 14a disposed at the lower side of the battery 160. The supporter 14a supports the battery 160. The supporter 14a may be disposed between the left spin-mop module 120 and the right spin-mop module 120. The supporter 14a is disposed on the center portion of the body 110 in the transverse direction. The entire supporter 14a may have a square columnar shape.

The battery support unit 14 includes a retainer 14b, which limits the horizontal movement of the battery 160. The retainer 14b includes a first retainer 14b1, which is in contact with the front surface of the battery 160, and a second retainer 14b2, which is in contact with the rear surface of the battery 160.

The battery support unit 14 includes a main groove 14g, into which the common pipe 156-2m is inserted. The main groove 14g is formed in the supporter 14a. The main groove 14g is formed in the rear surface of the supporter 14a. When the common pipe 156-2m is caught by the main groove 14g, the common pipe 156-2m is kept in place.

The battery support unit 14 includes two branch grooves 14h, into which the first branch pipe 156-2a and the second branch pipe 156-2b are inserted. The two branch grooves 14h are formed in the supporter 14a. The two branch grooves 14h are formed respectively in the supporter 14a in the transverse direction. When the first branch pipe 156-2a and the second branch pipe 156-2b are respectively caught by the two branch grooves 14h, the first branch pipe 156-2a and the second branch pipe 156-2b are kept in place.

The supporter 14a may guide the position of the three-way connector 156-2t. Three flow-path portions of the three-way connector 156-2t may be respectively inserted into and disposed in the main groove 14g and the two branch grooves 14h.

Referring to FIGS. 11 to 14, the cleaner 100 may further include a sterilized water generating module 170. The sterilized water generating module 170 may be configured to generate sterilized water via the electrolysis of water inside the water tank 151. For example, sterilized hypochlorous acid (HClO) may be generated via electrolysis using a chlorine component contained in tap water. The sterilized water generating module 170 may be disposed in the water tank 151.

The sterilized water generating module 170 includes a pair of electrodes 171 spaced apart from each other. One of the pair of electrodes 171 forms a "+"-pole, and the other one forms a "−"-pole. The sterilized water is generated via the electrolysis of water by charges supplied from the pair of electrodes 171. The sterilized water generating module 170 includes a power connector 173, which receives electricity of the battery 160. Power is supplied to the pair of electrodes 171 via the power connector 173. The sterilized water generating module 170 includes a module case 175, which accommodates therein the pair of electrodes 171. The power connector 173 may be disposed on the lower surface of the module case 175. The sterilized water generating module 170 includes a communication portion 177, which forms an opening in order to allow the sterilized water generated by the pair of electrodes 171 to be introduced into the water tank 151. The communication portion 177 is disposed in the upper portion of the module case 175.

What is claimed is:
1. A cleaner comprising:
a body forming an external appearance;
a rotating plate provided at a lower side of the body;
a mop unit coupled to a lower side of the rotating plate so as to be in contact with a floor;
a spin shaft connected to an upper side of the rotating plate so as to rotate the rotating plate;
a water supply reservoir configured to surround a periphery of the spin shaft and spaced apart from the spin shaft so as to define a water supply space; and
a water supply module configured to supply water to the water supply space,
wherein the rotating plate forms a water supply hole configured to interconnect the water supply space and the lower side of the rotating plate,
wherein the water supply space is open at an upper side thereof, and is configured so that water is introduced into the water supply space through the upper side of the water supply space.
2. The cleaner according to claim 1, wherein the water supply reservoir protrudes upward of the rotating plate, and extends in a peripheral direction of the spin shaft.
3. The cleaner according to claim 2, wherein the water supply reservoir takes a form of a ring-shaped rib.

4. The cleaner according to claim 1, wherein the water supply hole is provided in a plural number so that a plurality of water supply holes is spaced apart from each other by a constant distance in a peripheral direction of the spin shaft.

5. The cleaner according to claim 1, wherein: the rotating plate comprises a slope formed along a periphery of a lower end of the spin shaft, the slope forming a downward inclination in a centrifugal direction (XO); and
the water supply hole is located in the centrifugal direction (XO) of a lower end portion of the slope.

6. The cleaner according to claim 1, wherein a side surface in a centrifugal direction (XO) of the water supply hole and a side surface in a counter-centrifugal direction (XI) of the water supply reservoir are provided so as to extend vertically.

7. The cleaner according to claim 1, further comprising:
a water supply cabinet configured to form a space indented upward from a lower surface of the body to accommodate an upper end portion of the water supply reservoir therein; and
a water feeder configured to guide water to pass through the water supply cabinet and to be introduced into the water supply reservoir.

8. The cleaner according to claim 7, wherein the water supply cabinet comprises:
a rotating-shaft support portion configured to rotatably support the spin shaft; and
a partition configured to protrude from the rotating-shaft support portion so as to cover the upper end portion of the water supply reservoir.

9. The cleaner according to claim 1, further comprising:
a water supply cabinet disposed at the lower side of the body and configured to cover an upper side of the water supply reservoir when viewed from an upper side; and
a water feeder configured to guide water to pass through the water supply cabinet and to be introduced into the water supply reservoir,
wherein the water supply module comprises:
a water tank configured to store the water therein; and
a supply pipe configured to connect the water tank and the water feeder to each other so as to guide movement of the water.

10. The cleaner according to claim 1, further comprising:
a rotating-shaft support portion, a lower end portion of which is inserted into the water supply space, configured to rotatably support the spin shaft; and
a partition configured to protrude from the rotating-shaft support portion so as to cover an upper end portion of the water supply reservoir.

11. The cleaner according to claim 1, further comprising a tilting frame disposed on the body so as to be tiltable within a predetermined angular range,
wherein the spin shaft is rotatably coupled to the tilting frame so as to be tiltable integrally with the tilting frame.

12. The cleaner according to claim 11, further comprising a water feeder fixedly disposed on the tilting frame and configured to guide water so as to be introduced into the water supply reservoir,
wherein the water supply module comprises:
a water tank configured to store the water therein; and
a supply pipe configured to connect the water tank and the water feeder to each other so as to guide movement of the water, the supply pipe flexibly bending depending on tilting of the tilting frame.

13. The cleaner according to claim 1, wherein: the water supply module comprises a water tank configured to store water therein and a pump configured to apply pressure to the water in the water tank so as to supply the water to the water supply space; and
the cleaner further comprises a controller configured to control the pump to adjust an amount of water to be supplied.

14. A cleaner comprising:
a body forming an external appearance;
a left spin-mop module and a right spin-mop module provided to perform mopping; and
a water supply module configured to supply water to the left spin-mop module and the right spin-mop module,
wherein each of the left spin-mop module and the right spin-mop module comprises:
a rotating plate provided at a lower side of the body;
a mop unit coupled to a lower side of the rotating plate so as to be in contact with a floor;
a spin shaft connected to an upper side of the rotating plate so as to rotate the rotating plate;
a water supply reservoir configured to surround a periphery of the spin shaft and spaced apart from the spin shaft so as to define a water supply space; and
a water feeder configured to guide water so as to be introduced into the water supply reservoir,
wherein the rotating plate forms a water supply hole configured to interconnect the water supply space and the lower side of the rotating plate,
wherein the water supply space is open at an upper side thereof, and is configured so that water is introduced into the water supply space through the upper side of the water supply space.

15. The cleaner according to claim 14, wherein: the water supply module comprises:
a water tank configured to store the water therein; and
a supply pipe configured to connect the water tank and the water feeder to each other so as to guide movement of the water; and
the supply pipe comprises:
a common pipe configured to guide movement of the water at an upstream side;
a first branch pipe configured to guide a portion of the water in the common pipe to the left spin-mop module; and
a second branch pipe configured to guide a remaining portion of the water in the common pipe to the right spin-mop module.

* * * * *